(12) United States Patent
Foidart

(10) Patent No.: US 12,458,649 B2
(45) Date of Patent: Nov. 4, 2025

(54) CONTRACEPTIVE COMPOSITIONS WITH REDUCED ADVERSE EFFECTS

(71) Applicant: ESTETRA SRL, Liège (BE)

(72) Inventor: Jean-Michel Foidart, Liege (BE)

(73) Assignee: ESTETRA SRL, Liège (BE)

( * ) Notice: Subject to any disclaimer, the term of this patent is extended or adjusted under 35 U.S.C. 154(b) by 898 days.

(21) Appl. No.: 17/701,588

(22) Filed: Mar. 22, 2022

(65) Prior Publication Data

US 2022/0211722 A1    Jul. 7, 2022

Related U.S. Application Data

(63) Continuation of application No. PCT/EP2021/059890, filed on Apr. 16, 2021.

(30) Foreign Application Priority Data

Apr. 16, 2020   (EP) ................... 20169870

(51) Int. Cl.
  *A61K 31/565* (2006.01)
  *A61K 31/567* (2006.01)
  *A61K 31/585* (2006.01)
  *A61P 15/18* (2006.01)

(52) U.S. Cl.
  CPC .......... *A61K 31/567* (2013.01); *A61K 31/565* (2013.01); *A61K 31/585* (2013.01); *A61P 15/18* (2018.01)

(58) Field of Classification Search
  CPC ...... A61K 31/567; A61K 31/565; A61P 15/18
  See application file for complete search history.

(56) References Cited

U.S. PATENT DOCUMENTS

| 3,138,588 | A | 6/1964 | Smith |
| 3,433,785 | A | 3/1969 | Phillips et al. |
| 5,073,374 | A | 12/1991 | McCarty |
| 5,164,405 | A | 11/1992 | McFarlane et al. |
| 5,340,586 | A | 8/1994 | Pike et al. |
| 6,117,446 | A | 9/2000 | Place |

(Continued)

FOREIGN PATENT DOCUMENTS

| CA | 2819663 | 7/2012 |
| CL | 200501207 | 5/2005 |

(Continued)

OTHER PUBLICATIONS

Mawet et al., The European Journal of Contraception and Reproductive Health Care, 2015;20:463-475 (Year: 2015).*

(Continued)

*Primary Examiner* — San Ming R Hui
(74) *Attorney, Agent, or Firm* — Foley & Lardner LLP

(57) ABSTRACT

The present invention relates to a combined oral contraceptive with a reduced risk for side effects, including a reduced risk for QT interval prolongation, a reduced risk for testosterone decrease and a reduced risk for elevated C-reactive protein levels when compared to other combined oral contraceptives. The estetrol/drospirenone combined oral contraceptive described herein shows favorable pharmacokinetics for the progestogenic component. Use of a specific estrogenic component in the combined oral contraceptive entails multiple benefits over currently available combined oral contraceptives.

13 Claims, 2 Drawing Sheets

(56) References Cited

U.S. PATENT DOCUMENTS

| | | |
|---|---|---|
| 6,475,510 B1 | 11/2002 | Venkatesh et al. |
| 6,723,348 B2 | 4/2004 | Faham et al. |
| 6,992,218 B2 | 1/2006 | Dietlin et al. |
| 7,723,320 B2 | 5/2010 | Bunschoten et al. |
| 7,732,430 B2 | 6/2010 | Bunschoten et al. |
| 7,871,995 B2 | 1/2011 | Bunschoten et al. |
| 7,923,440 B2 | 4/2011 | Bunschoten et al. |
| 7,943,604 B2 | 5/2011 | Coelingh Bennink et al. |
| 8,026,228 B2 | 9/2011 | Coelingh Bennink et al. |
| 8,048,869 B2 | 11/2011 | Bunschoten et al. |
| 8,236,785 B2 | 8/2012 | Coelingh Bennink |
| 8,303,868 B2 | 11/2012 | Maruyama |
| 8,367,647 B2 | 2/2013 | Coelingh Bennink et al. |
| 8,518,923 B2 | 8/2013 | Visser et al. |
| 8,808,735 B2 | 8/2014 | Bertelsen et al. |
| 8,987,240 B2 | 3/2015 | Coelingh Bennink et al. |
| 8,987,484 B2 | 3/2015 | Pascal |
| 9,034,854 B2 | 5/2015 | Coelingh Bennink et al. |
| 9,040,509 B2 | 5/2015 | Coelingh Bennink et al. |
| 9,238,035 B2 | 1/2016 | Foidart et al. |
| 9,561,238 B2 | 2/2017 | Coelingh Bennink et al. |
| 9,579,329 B2 | 2/2017 | Wouters et al. |
| 9,603,860 B2 | 3/2017 | Perrin et al. |
| 9,884,064 B2 | 2/2018 | Platteeuw et al. |
| 9,987,287 B2 | 6/2018 | Platteeuw et al. |
| 9,988,417 B2 | 6/2018 | Ferreiro Gil et al. |
| 10,000,524 B2 | 6/2018 | Verhaar et al. |
| 10,179,140 B2 | 1/2019 | Perrin et al. |
| 10,201,611 B2 | 2/2019 | Bennink et al. |
| 10,660,903 B2 | 5/2020 | Jaspart et al. |
| 10,888,518 B2 | 1/2021 | Jaspart et al. |
| 10,894,014 B2 | 1/2021 | Jaspart et al. |
| 11,147,771 B2 | 10/2021 | Jaspart et al. |
| 11,452,733 B2 | 9/2022 | Taziaux et al. |
| 11,484,539 B2 | 11/2022 | Taziaux et al. |
| 11,666,585 B2 | 6/2023 | Taziaux et al. |
| 11,793,760 B2 | 10/2023 | Jaspart et al. |
| 11,896,602 B2 | 2/2024 | Jost et al. |
| 11,957,694 B2 | 4/2024 | Jaspart et al. |
| 11,964,055 B2 | 4/2024 | Jaspart et al. |
| 2002/0132801 A1 | 9/2002 | Heil et al. |
| 2002/0193356 A1 | 12/2002 | Van Beek et al. |
| 2004/0009960 A1 | 1/2004 | Heil et al. |
| 2004/0192620 A1 | 9/2004 | Bunschoten et al. |
| 2004/0198671 A1 | 10/2004 | Bunschoten et al. |
| 2005/0032755 A1 | 2/2005 | Van Look et al. |
| 2005/0106240 A1 | 5/2005 | Tanaka et al. |
| 2005/0113350 A1 | 5/2005 | Duesterberg et al. |
| 2005/0147670 A1 | 7/2005 | Hsu et al. |
| 2005/0261209 A1 | 11/2005 | Bunschoten et al. |
| 2006/0211669 A1 | 9/2006 | Verhaar et al. |
| 2006/0276414 A1 | 12/2006 | Coelingh Bennink et al. |
| 2007/0048369 A1 | 3/2007 | Foreman et al. |
| 2007/0286819 A1 | 12/2007 | Devries et al. |
| 2007/0286829 A1 | 12/2007 | Batista |
| 2008/0113953 A1 | 5/2008 | De Vries et al. |
| 2008/0166406 A1 | 7/2008 | Kristjansson |
| 2010/0035987 A1 | 2/2010 | Mang et al. |
| 2010/0093679 A1 | 4/2010 | Heil et al. |
| 2011/0021504 A1 | 1/2011 | Andreela et al. |
| 2011/0250272 A1 | 10/2011 | Besse et al. |
| 2011/0250274 A1 | 10/2011 | Shaked et al. |
| 2012/0077888 A1 | 3/2012 | Ramtoola et al. |
| 2012/0128733 A1 | 5/2012 | Perrin et al. |
| 2012/0220556 A1 | 8/2012 | Heil et al. |
| 2013/0079400 A1 | 3/2013 | Riedl et al. |
| 2014/0083639 A1 | 3/2014 | Bonini et al. |
| 2014/0107091 A1 | 4/2014 | Pascal |
| 2014/0107358 A1 | 4/2014 | Pascal |
| 2014/0235882 A1 | 8/2014 | Platteeuw et al. |
| 2015/0045300 A1 | 2/2015 | Ahuja et al. |
| 2015/0098978 A1 | 4/2015 | Gao et al. |
| 2015/0182540 A1 | 7/2015 | Heil et al. |
| 2016/0101116 A1 | 4/2016 | Foidart et al. |
| 2016/0310506 A1 | 10/2016 | Platteeuw et al. |
| 2016/0367567 A1 | 12/2016 | Jaspart et al. |
| 2017/0196886 A1 | 7/2017 | Wouters et al. |
| 2017/0216318 A1 | 8/2017 | Perrin et al. |
| 2017/0369521 A1 | 12/2017 | Platteeuw et al. |
| 2018/0265540 A1 | 9/2018 | Verhaar et al. |
| 2019/0167700 A1 | 6/2019 | Jost et al. |
| 2020/0004672 A1 | 1/2020 | Scott et al. |
| 2020/0046729 A1 | 2/2020 | Jost et al. |
| 2020/0352959 A1 | 11/2020 | Jaspart et al. |
| 2021/0154211 A1 | 5/2021 | Taziaux et al. |
| 2021/0154212 A1 | 5/2021 | Taziaux et al. |
| 2022/0096385 A1 | 3/2022 | Jaspart et al. |
| 2023/0025785 A1 | 1/2023 | Taziaux et al. |
| 2023/0031329 A1 | 2/2023 | Taziaux et al. |
| 2023/0050253 A1 | 2/2023 | Taziaux et al. |
| 2023/0073911 A1 | 3/2023 | Taziaux et al. |
| 2024/0238209 A1 | 7/2024 | Jaspart et al. |

FOREIGN PATENT DOCUMENTS

| | | |
|---|---|---|
| CL | 201400802 | 4/2014 |
| CL | 2013003435 A1 | 8/2014 |
| CN | 1197387 A | 10/1998 |
| CN | 1482921 | 3/2004 |
| CN | 1780634 A | 5/2006 |
| CN | 101378762 A | 3/2009 |
| CN | 101443015 A | 5/2009 |
| CN | 101541326 A | 9/2009 |
| CN | 101631536 A | 1/2010 |
| CN | 101780073 A | 7/2010 |
| CN | 104379148 | 2/2015 |
| CN | 107787224 | 3/2018 |
| CN | 102058604 A | 5/2018 |
| DE | 20 2009 018 024 U1 | 12/2010 |
| EP | 0 136 011 A2 | 4/1985 |
| EP | 0 286 581 A1 | 10/1988 |
| EP | 0 371 466 A1 | 6/1990 |
| EP | 0 646 592 A | 4/1995 |
| EP | 0 686 037 | 12/1995 |
| EP | 2 001 0201.7 | 11/2002 |
| EP | 0 748 190 B1 | 7/2003 |
| EP | 1 700 602 A1 | 9/2006 |
| EP | 3 046 928 B1 | 7/2016 |
| EP | 3 106 148 A1 | 12/2016 |
| JP | H03-237557 | 10/1991 |
| JP | 2002-508330 A | 3/2002 |
| JP | 2005-523283 T | 8/2005 |
| JP | 2009-256344 A | 11/2009 |
| JP | 2010-513514 T | 4/2010 |
| JP | 2012-240917 A | 12/2012 |
| JP | 2014-224079 A | 12/2014 |
| JP | 2015-514731 T | 5/2015 |
| JP | 2018-165263 A | 10/2018 |
| WO | WO-95/02408 A1 | 1/1995 |
| WO | WO-95/17895 | 7/1995 |
| WO | WO-96/03929 A1 | 2/1996 |
| WO | WO-99/30728 | 6/1999 |
| WO | WO-00/42942 | 7/2000 |
| WO | WO-00/42955 A1 | 7/2000 |
| WO | WO-00/76522 A1 | 12/2000 |
| WO | WO-01/05806 A1 | 1/2001 |
| WO | WO-01/40255 A2 | 6/2001 |
| WO | WO-01/52857 | 7/2001 |
| WO | WO-02/49675 A1 | 6/2002 |
| WO | WO-02/094275 A1 | 11/2002 |
| WO | WO-02/094276 A1 | 11/2002 |
| WO | WO-02/094277 A1 | 11/2002 |
| WO | WO-02/094278 A1 | 11/2002 |
| WO | WO-02/094279 A1 | 11/2002 |
| WO | WO-02/094280 | 11/2002 |
| WO | WO-02/094281 A1 | 11/2002 |
| WO | WO-03/018026 A1 | 3/2003 |
| WO | WO-03/041718 A1 | 5/2003 |
| WO | WO-2004/000197 | 12/2003 |
| WO | WO-2004/006936 A1 | 1/2004 |
| WO | WO-2004/019954 A1 | 3/2004 |
| WO | WO-2004/041289 A1 | 5/2004 |
| WO | WO-2004/096259 | 11/2004 |
| WO | WO-2004/103377 A1 | 12/2004 |

(56) References Cited

FOREIGN PATENT DOCUMENTS

| | | |
|---|---|---|
| WO | WO-2005/030175 A1 | 4/2005 |
| WO | WO-2005/030176 A1 | 4/2005 |
| WO | WO-2005/051400 A1 | 6/2005 |
| WO | WO-2005/105103 A2 | 11/2005 |
| WO | WO-2005/115349 A1 | 12/2005 |
| WO | WO-2005/115351 A1 | 12/2005 |
| WO | WO-2006/002937 | 1/2006 |
| WO | WO-2006/027347 A1 | 3/2006 |
| WO | WO-2006/120035 A2 | 11/2006 |
| WO | WO-2006/125800 A2 | 11/2006 |
| WO | WO-2007/002823 | 1/2007 |
| WO | WO-2007/081206 A1 | 7/2007 |
| WO | WO-2007/106264 A2 | 9/2007 |
| WO | WO-2007/146805 | 12/2007 |
| WO | WO-2008/003363 A1 | 1/2008 |
| WO | WO-2008/003432 A1 | 1/2008 |
| WO | WO-2008/156365 A1 | 12/2008 |
| WO | WO-2010/012490 A1 | 2/2010 |
| WO | WO-2010/033832 A2 | 3/2010 |
| WO | WO-2010/089078 A1 | 8/2010 |
| WO | WO-2010/149273 A1 | 12/2010 |
| WO | WO-2011/128336 A1 | 10/2011 |
| WO | WO-2011/128338 | 10/2011 |
| WO | WO-2012/000981 A1 | 1/2012 |
| WO | WO-2012/055840 A1 | 5/2012 |
| WO | WO-2013/012326 A1 | 1/2013 |
| WO | WO-2013/021025 A1 | 2/2013 |
| WO | WO-2013/090117 A1 | 6/2013 |
| WO | WO-2013/156329 | 10/2013 |
| WO | WO-2014/159377 A1 | 10/2014 |
| WO | WO-2014/189836 A1 | 11/2014 |
| WO | WO-2014/189838 | 11/2014 |
| WO | WO-2015/040051 A1 | 3/2015 |
| WO | WO-2015/086643 A1 | 6/2015 |
| WO | WO-2016/053946 A1 | 4/2016 |
| WO | WO-2016/187269 A1 | 11/2016 |
| WO | WO-2016/023009 A1 | 12/2016 |
| WO | WO-2016/203006 A1 | 12/2016 |
| WO | WO-2016/203009 A1 | 12/2016 |
| WO | WO-2016/203011 A1 | 12/2016 |
| WO | WO-2016/203044 A1 | 12/2016 |
| WO | WO-2016/207298 A1 | 12/2016 |
| WO | WO-2018/015503 | 1/2018 |
| WO | WO-2018/024912 A1 | 2/2018 |
| WO | WO-2018/065076 A1 | 4/2018 |
| WO | WO-2019/154899 A1 | 8/2019 |
| WO | WO-2019/202141 A1 | 10/2019 |
| WO | WO-2019/202142 A1 | 10/2019 |
| WO | WO-2021/209591 A1 | 10/2021 |

OTHER PUBLICATIONS

Goldman et al., Endocrine Reviews 38: 302-324, 2017 (Year: 2017).*
Apter et al., "Bleeding pattern and cycle control with estetrol-containing combined oral contraceptives: results from a phase II, randomised, dose-finding study (FIESTA)," Contraception vol. 94, No. 4, pp. 366-373 (May 2016).
U.S. Appl. No. 15/737,189, filed Dec. 15, 2017, Estetra SRL.
U.S. Appl. No. 15/737,233, filed Dec. 15, 2017, Estetra SRL.
U.S. Appl. No. 17/893,999, filed Aug. 23, 2022, Estetra SRL.
U.S. Appl. No. 17/900,576, filed Aug. 31, 2022, Estetra SRL.
U.S. Appl. No. 17/963,712, filed Oct. 11, 2022, Estetra SRL.
U.S. Appl. No. 17/972,403, filed Oct. 24, 2022, Estetra SRL.
Duavive (bazedoxifene), Eur. Med. Agency, Dec. 2014.
Duijkers et al., "Inhibition of ovulation by administration of estetrol in combination with drospirenone or levonorgestrel: Results of a phase II dose-finding pilot study," The European Journal of Contraception and Reproductive Health Case, 2015; 20, 476-489.
E4 Relief, www.e4relief.com/cz, Wayback Machine snapshot of webpage from Jan. 2, 2017.
Kluft et al., "Oral contraceptive formulations with estetrol as an estrogen, in combination with levonorgestrel or drospirenone, show minor effects on haemostasis." Journal of Thrombosis and Haemostasis, Jul. 4, 2013, vol. 11, No. s2, pp. 737.
NCT02834312, "E4Relief (Response to Estetrol in Life Improvement for Menopausal-associated Hot Flushes)," ClinicalTrials.Gov (Jul. 2016).
Thurston et al., Obstet Gynecol Clin North Am. Sep. 2011 ; 38(3): 489-501 (Year: 2011).
NCT02834312, "E4Relief (Response to Estetrol in Life Improvement for MEnopausal-associated Hot Flushes)," ClinicalTrials.Gov (Jan. 25, 2018).
NCT02834312, "E4Relief (Response to Estetrol in Life Improvement for Menopausal-associated Hot Flushes)," ClinicalTrials.Gov (Jul. 12, 2016).
NCT02834312, "E4Relief (Response to Estetrol in Life Improvement for Menopausal-associated Hot Flushes)," ClinicalTrials.Gov (Jul. 28, 2016).
Duijkers et al."Inhibition of ovulation by administration of estetrol in combination with drospirenone or levonorgestrel: Results of a phase II dose-finding pilot study"; European Journal of Contraception & Reproductive Health Care: The Official Journal of the European Society of Contraception, Jan. 1, 2015, 20(6):476-489, by Ingrid J.M. (Year: 2015).
EPAR "Duavive EPAR, Conjugated Oestrogens / Bazedoxifene", European Medicines Agency, 3P., Retrieved from Internet, Dec. 2014.
Guangjie Chen et al "Research progress on the relationship between sex hormones and the occurrence and development of rheumatoid arthritis", Current Immunology, vol. 37 (3), 2017.
Hauck BA, Brown V. "A primer on the hormone-free interval for combined oral contraceptives", Current Medical Research and Opinion. Oct. 3, 2015;31(10):1941-8.
Klipping et al. "Suppression of ovarian activity with a drospirenone-containing oral contraceptive in a 24/4 regimen" Elsevier; Contraception 78 (2008) 16-25.
Momoeda, M, et al. "Does the presence of coexisting diseases modulate the effectiveness of a low-dose estrogen/progestin, ethinylestradiol/drospirenone combination tablet in dysmenorrhea? Reanalysis of two randomized studies in Japanese women." International Journal of Women's Health (Feb. 12, 2014): 989-998. (Year: 2014).
Office Action dated Apr. 20, 2024 received in Chinese Patent Application No. 202211280507.8.
Office Action dated May 1, 2024 received in Chinese Patent Application No. 202211257175.1.
Padilla et al., "A Neural Circuit Underlying the Generation of Hot Flushes" Published in final edited form as: Cell Rep. Jul. 10, 2018; 24(2): 271-277.
T Ghosh et al. "A review on new generation orodispersible tablets and its future prospective" International Journal of Pharmacy and Pharmaceutical Sciences; vol. 3, Issue 1, 2011; pp. 1-7; ISSN-0975-1491.
Westhoff C L, Eisenberger A, Tang R, et al. "Clotting factor changes during the first cycle of oral contraceptive use, Contraception" vol. 93, Jan. 31, 12016.
Wu Yucheng et al Clinical Endocrine and Metabolic Diseases, p. 233; Jilin Science and Technology Publishing House; Sep. 30, 2017.
Yang Xi, et al. Osteoporosis Medication Tips, p. 139; People's Military Medical Publising House; Sep. 30, 2014.
Yasmin: Risk of venous thromboembolism higher than levonorgestrel-containing pills "Drug Safety Update" Jun. 2011, vol. 4 issue 11: A2). (Year: 2011).
Zhang et al., "The Effects of Estrogens on Neural Circuits That Control Temperature" Endocrinology, (May 3, 2021) vol. 162, No. 8, 1-12.
"Illustrated Glossary of Organic Chemistry", retrieved from http://www.chem.ucla.edu/~harding/IGOC/H/hydrate.html printed Apr. 19, 2022.
"Pharmaceutics of Biological Drugs," Editor in chief: Zhao Yingzheng, pp. 17 and 18, Zhejiang University Press (published on Jun. 30, 2011).
"Pharmaceutics," Editor in Chief: Liu Shubao, p. 153, Henan Science and Technology Press (published on Jul. 31, 2007).

(56) References Cited

OTHER PUBLICATIONS

Abot et al., The uterine and vascular actions of estetrol delineate a distinctive profile of estrogen receptor alpha modulation, uncoupling nuclear and membrane activation, EMBO Molecular Medicine, vol. 6, No. 10, 2014 (19 pages).
Al-Jefout et al., "Continuous Norethisterone Acetate versus Cyclical Drospirenone 3mg/Ethinyl Estradiol 20 ug for the Management of Primary Dysmenorrhea in Young Adult Women," Journal of Pediatric and Adolescent Gynecology, vol. 29, No. 2, pp. 143-147, XP029421056 (Sep. 2015).
Alam et al., "Solid dispersions: a strategy for poorly aqueous soluble drugs and technology updates," Expert Opin. Drug Deliv. vol. 9, No. 11, pp. 1420-1440 (2012).
Alexander et al., "Why consider vaginal drug administration?" Fertility and Sterility, vol. 82, No. 1 (Jul. 2004).
Andersch and Milsom, "An epidemiologic study of young women with dysmenorrhea", Am J Obstet Gynecol, 144(6), p. 655-660 (1982).
Anderson and Spencer, "Risk factors for venous thromboembolism", Circulation, vol. No. 107, 2003, pp. I-9-I-16.
Anderson et al., "Effects of conjugated equine estrogen in postmenopausal women with hysterectomy: the Women's Health Initiative randomized controlled trial", JAMA (2004), vol. 291(14), pp. 1701-1712.
Apter, D. et al., "Estetrol combined with drospirenone: an oral contraceptive with high acceptability, user satisfaction, well-being and favourable body weight control", The European Journal of Contraception and Reproductive Health Care, vol. No. 22, Issue No. 4, 2017, pp. 260-267.
Archer et al., "A randomized, double-blind, placebo-controlled study of the lowest effective dose of drospirenone with 17ß-estradiol for moderate to severe vasomotor symptoms in postmenopausal women," (2014) Menopause, vol. 21(3), pp. 227-235.
Arnal et al., "Tissue specificity of the membrane vs nuclear actions of estrogen receptor alpha: insights from targeted mutations in mouse models," Archives of Cardiovascular Diseases Supplements, (Apr. 2016) vol. 8, 99-217, Abstract 0333.
Bagot et al., "The effect of estrone on thrombin generation may explain the different thrombotic risk between oral and transdermal hormone replacement therapy", J Thromb Haemost., 8(8):1736-1744 (2010).
Bennink et al., "Estetrol (E4), the forgotten fetal steroid", 9th European Congress of Endocrinology Meeting Abstract No. S16,2, Endocrine Abstracts, vol. No. 14 (2007).
Bennink et al., "Estetrol review: profile and potential clinical applications," Climacteric (2008) vol. 11, Suppl. 1, pp. 47-58.
Bennink et al., "Pharmacodynamic effects of the fetal estrogen estetrol in postmenopausal women: results from a multiple-rising-dose study," (2017) Menopause 24(6), pp. 677-685.
Bennink et al., "Pharmacokinetics of the fetal estrogen estetrol in a multiple-rising-dose study in postmenopausal women," (2017) Climacteric.20(3), pp. 285-289.
Bianchi, "Estetrol: Desde Un Estrogeno Fetal Hasta El Tratamiento De La Menopausia," Rev. Chil. Obstet. Ginecol., vol. 74, No. 2, pp. 123-126 (2009).
Bird et al., "Drospirenone and non-fatal venous thromboembolism: is there a risk difference by dosage of ethinyl-estradiol?" Journal of Thrombosis and Haemostasis, vol. 11, pp. 1059-1068 (2013).
Bjarnason et al., "Acute and long-term estradiol kinetics in smoking postmenopausal women," (2012) Climacteric, vol. 15(5), pp. 449-454.
Blanco-Molina, M.A. et al., "Progestin-only contraception and venous thromboembolism", Thrombosis Research, vol. No. 129, 2012, pp. e257-e262.
Bosworth et al., "Depressive symptoms, menopausal status, and climacteric symptoms in women at midlife," (2001) Psychosom Med., 63(4):603-8.
Brenková et al., CHISA 2006—17th International Congress of Chemical and Process Engineering.
Bull et al., "Synthesis and structure-activity studies of 8a- and 9beta-analogues of 14, 17-ethanoestradiol", J. Chem. Soc., Perkin Trans 1, 2000, pp. 1003-1013.
Callejo et al., "Effect of a low-dose oral contraceptive containing 20 microg ethinylestradiol and 150 microg desogestrel on dysmenorrhea", Contraception, 68(3), p. 183-188 (2003).
Chilukuri, D. et al., "Pharmaceutical Product Development: In Vitro-In Vivo Correlation", Informa Healthcare, Drugs and the Pharmaceutical Sciences, vol. No. 165, 2007, 216 pages.
Coelingh Bennink et al., "Ovulation inhibition by estetrol in an in vivo model" Contraception, 2008, vol. 77, pp. 186-190.
Coelingh Bennink Herjan J T et al., "Clinical effects of the fetal estrogen estetrol in a multiple-rising-dose study in postmenopausal women," (2016) Maturitas, Elsevier, Amsterdam, NL vol. 91, pp. 93-100, XP029649879.
Dahlback et al., "Familial thrombophilia due to a previously unrecognized mechanism characterized by poor anticoagulant response to activated protein C: prediction of a cofactor to activated protein C", Proc Natl Acad Sci U S A., 90(3), p. 1004-1008 (1993).
Davis et al., "Oral contraceptives for dysmenorrhea in adolescent girls: a randomized trial", Obstet Gynaecol, 106(1): 97-104 (2005).
De Bastos et al., "Combined oral contraceptives: venous thrombosis", Cochrane Database Syst Rev, (3):CD010813 (2014).
Dey et al., "Orodispersible tablets: A new trend in drug delivery," Journal of Natural Science, Biology, and Medicine, vol. 1, No. 1, p. 2-5, (Jul. 2010).
Dinger et al., "Effectiveness of Oral Contraceptive Pills in a Large U.S. Cohort Comparing Progestogen and Regimen", Obstet. & Gynecol., 117(1):33-40 (2011).
Dinger et al., "Oral Contraceptive Effectiveness According to Body Mass Index, Weight, Age, and Other Factors", Am. J. Obstet. Gynecol., 201:263e1-9 (2009).
Dinger et al., "Risk of venous thromboembolism and the use of dienogest- and drospirenone-containing oral contraceptives: results from a German case-control study", J Fam Plann Reprod Health Care, 36(3), 2010, pp. 123-129.
Duijkers et al., "A randomized study comparing the effect on Ovarian activity of a progestogen-only pill (POP) containing desogestrel and a new POP containing drospirenone in a 24/4 regimen", Euro. J. Contracept. & Repro. Health Care, 20(6):419-27 (2015).
Duijkers et al., "Inhibition of ovulation by administration of estetrol in combination with drospirenone or levonorgestrel: Results of a phase II dose-finding pilot study," The European Journal of Contraception and Reproductive Health Care (2015) vol. 20, pp. 476-489.
Elger et al., "Conception and pharmacodynamics profile of drospirenone", Steriods, 68(10):891-905 (2003).
Endrikat et al., "A twelve-month comparative clinical investigation of two low-dose oral contraceptives containing 20 micrograms ethinylestradiol/75 micrograms gestodene and 20 micrograms ethinylestradiol/150 micrograms desogestrel, with respect to efficacy, cycle control and tolerance", Contraception, 52(4), p. 229-235 (1995).
Erkkola et al., "Role of progestins in contraception", Acta Obstet Gynecol Scand., 84(3), pp. 207-216 (2005).
European Society of Contraception and Reproductive Health (ESC), "Estelle®; the new contraceptive pill containing the fetal estrogen estetrol (E4)", I4th Congress, 2nd Global Conference, May 4 to May 7, 2016, Switzerland.
European Society of Contraception and Reproductive Health (ESC), "New molecules, applications (and regimens)—Room Sydney—Estetrol", I4th Congress, 2nd Global Conference, May 4 to May 7, 2016, Switzerland.
Fine, P., Update on Emergency Contraception, Advances in Therapy, vol. No. 28, Issue No. 2, 2010, pp. 87-90.
Foidart, "Estelle?, Estetrol and drospirenone in oral contraception: E4 Freedom TM Phase 3 clinical study design," Presented at Eur. Soc. Contraception & Reprod. Health, 14th Cong, 2nd Global Conf. (May 5, 2016).
Foidart, "Estetrol, the first human, physiological Selective Estrogen Receptor Modulator," Presented at Eur. Soc. Contraception & Reprod. Health, 14th Cong, 2nd Global Conf. (May 5, 2016).
French, "Dysmenorrhea", Am Fam Physician, 71(2): 285-291 (2005).

(56) References Cited

OTHER PUBLICATIONS

Gardouh et al., "Preparation and Characterization of Mucoadhesive Buccal Film for Delivery of Meloxicam," British Journal of Pharmaceutical Research, vol. 3, No. 4, pp. 743-766 (Jun. 2013).
Ghandi et al., "BCS class IV drugs: Highly notorious candidates for formulation development," Journal of Controlled Release, vol. 248, pp. 71-95 (2017) (Available online Jan. 11, 2017).
Haque et al., "Development of polymer-bound fast-dissolving metformin buccal film with disintegrants," International Journal of Nanomedicine, vol. 10 (Suppl. I: Challenges in biomaterials research) pp. 199-205 (Oct. 2015).
Harada, T., "Dysmenorrhea and Endometriosis in Young Women," Yonago Acta medica, vol. 56, pp. 81-84 (2013).
Harel et al., "Dysmenorrhea in adolescents and young adults: an update on pharmacological treatments and management strategies," Expert Opinion on Pharmacotherapy, vol. 13 No. 15, (Sep. 2012) pp. 2157-2170, XP055389783.
Harlow et al., "Executive summary of the Stages of Reproductive Aging Workshop 10: addressing the unfinished agenda of staging reproductive aging", Journal of Clinical Endocrinology & Metabolism, vol. No. 97, Issue No. 4, 2012, pp. 1159-1168.
Harrington et al., "Cross-sectional association of endogenous steroid hormone, sex hormone-binding globulin, and precursor steroid levels with hemostatic factor levels in postmenopausal women", J Thromb Haemost., 15(1), p. 80-90 (2017).
Heinemann et al., "International versions of the Menopause Rating Scale (MRS)", 2003, Health Qual Life Outcomes, pp. 1:28.
Heinemann et al., "The Menopause Rating Scale (MRS) as outcome measure for hormone treatment? A validation study," (2004) Health Qual Life Outcomes, pp. 2:67.
Heinemann et al., "The Menopause Rating Scale (MRS) scale: A methodological review", 2004, Health Qual Life Outcomes, pp. 2:45.
Hendrix and Alexander, "Primary dysmenorrhea treatment with a desogestrel-containing low-dose oral contraceptive", 66(6), p. 393-399 (2002).
Hilditch et al., "A menopause specific quality of life questionnaire: development and psychometric properties," (1996) Maturitas, vol. 24(3), pp. 161-175.
International Search Report and Written Opinion on PCT Appl. Ser. No. PCT/EP2019/060220 dated Jul. 11, 2019 (10 pages) (WO2019/202141).
International Search Report and Written Opinion on PCT Appl. Ser. No. PCT/EP2019/060221 dated Jul. 11, 2019 (WO2019/202142).
International Search Report dated Jul. 21, 2017 in International Application No. PCT/EP2016/076104 (WO 2018/065076).
International Search Report dated May 2, 2019 in International Application No. PCT/EP2019/052980 (WO 2019/154899).
International Search Report dated Oct. 20, 2017 in International Application No. PCT/EP2017/069908 (WO 2018/024912).
International Search Report issued in International Patent Application No. PCT/EP2014/077127, mailed Feb. 3, 2015.
Jezerska, L. et al., "Particles segregation in pharmaceutical mixtures for direct tablets compression", VSB-Technical University of Ostrava, Jan. 2006, 8 pages.
Jick et al., "Risk of idiopathic cardiovascular death and nonfatal venous thromboembolism in women using oral contraceptives with differing progestagen components", Lancet, 346(8990), 1995, p. 1589-1593.
Kluft, "Effects on estrogenic and haemostatic variables of estetrol in combination with drospirenone," Presented at Eur. Soc. Contraception & Reprod. Health, 14th Cong, 2nd Global Conf. (May 5, 2016).
Kluft, C. et al., "Reduced hemostatic effects with drospirenone-based oral contraceptives containing estetrol vs. ethinyl estradiol", Contraception, vol. No. 95, Issue No. 2, 2016, pp. 140-147.
Lan, Y., "A New Excipient for Fast Disintegrating Oral Dosage Forms," (BASF) 2008.
Lianmei, L et al., "Major research advances in estetrol," (2009) J Reprod Med, vol. 18(3), pp. 305-308.

Lidegaard et al., "Hormonal contraception and risk of venous thromboembolism: national follow-up study," BMJ, 339:b2890, 2009, pp. 1-8.
Lidegaard et al., "Risk of venous thromboembolism from use of oral contraceptives containing different progestogens and oestrogen doses: Danish cohort study, Sep. 2001", BMJ, 2011, 343:d6423, 15 pages.
Mawet et al., "Unique effects on hepatic function, lipid metabolism, bone and growth endocrine parameters of estetrol in combined oral contraceptives," The European Journal of Contraception and Reproductive Health Care, (2015) vol. 20, pp. 463-475.
Meeting of the Committee for Medicinal Products for Human Use (CHMP) in Mar. 2021, https://www.aemps.gob.es/informa/boletines-aemps/boletin-chmp/2021-boletinchmp/reunion-del-comite-de-medicamentos-de-uso-humano-chmp-de-marzo-2021/.
Meulenbroeks et al: "21+7 day versus 24+4 day monophasic regimens of combined oral contraceptives for contraception (Protocol)", Cochrane database of systematic reviews, Issue 7, art. No. CD011781, 2015.
Nath and Sitruk-Ware, "Pharmacology and clinical applications of selective estrogen receptor modulators", Climacteric, vol. No. 12, Issue No. 3, Jun. 2009, pp. 188-205.
Nillius et al., "Plasma Levels of Progesterone After Vaginal, Rectal, or Intramuscular Administration of Progesterone," American Journal of Obstetrics and Gynecology, vol. 110, No. 4 (1971).
Notelovitz et al., "Initial 17ß-Estradiol Dose for Treating Vasomotor Symptoms," (2000) Obstetrics and Gynaecology, vol. 95(5), pp. 726-731.
Odlind et al., "Can changes in sex hormone binding globulin predict the risk of venous thromboembolism with combined oral contraceptive pills?", Acta Obstet. Gynecol. Scand., 81(6), p. 482-490.
Office Action issued on Dec. 23, 2019, in Israeli Application No. 256283.
Office Action issued on Dec. 15, 2021, in Dominican patent application No. P2019-0108.
Office Action issued on Feb. 11, 2020 in Colombian Application No. NC2017/0012766.
Office Action Issued on Feb. 18, 2020 in Indian Application No. 201817001353.
Office Action issued on Feb. 6, 2020 in Chinese Application No. 201680035627.8.
Office Action issued on Jan. 15, 2020, in Israeli Application No. 256282.
Office Action issued on Mar. 16, 2020 in Chinese Application No. 201680035626.3.
Office Action issued on Mar. 19, 2019, in Colombian application No. NC2017/0012766.
Office Action issued on Mar. 19, 2020, in Chilean Application No. 201901152.
Office Action issued on May 19, 2020 in Israeli Application No. 256282.
Office Action issued on May 19, 2020 in Israeli Application No. 256283.
Osayande, A. et al., "Diagnosis and Initial Management of Dysmenorrhea", American Family Physician, vol. No. 89, Issue No. 5, Mar. 1, 2014, pp. 341-346.
Perie et al., "Controlling Drug Delivery," Pharmaceutics: Drug Delivery and Targeting pp. 8-9 (Pharm. Press, 2d ed., 2012).
Pinkerton, JoAnn V., https://www.msdmanuals.com/esdo/professional/ginecolog%C3%ADa-yobstetricia/anomal%C3%ADas-menstruales/dismenorrea (Dec. 2020).
Poort et al., "A common genetic variation in the 3'-untranslated region of the prothrombin gene is associated with elevated plasma prothrombin levels and an increase in venous thrombosis", Blood, 88(10), p. 3698-3703 (1996).
Portman et al., "Genitourinary syndrome of menopause: new terminology for vulvovaginal atrophy from the International Society for the Study of Women's Sexual Health and the North American Menopause Society," (2014) Menopause, vol. 21(10), pp. 1063-1068.
Prandoni, P. et al., "An Association between Atherosclerosis and Venous Thrombosis", The New England Journal of Medicine, vol. No. 348, Issue No. 15, Apr. 10, 2003, pp. 1435-1441.

(56) References Cited

OTHER PUBLICATIONS

Prince et al., "Phase II Clinical Study of BC-3781, a Pleuromutilin Antibiotic, in Treatment of Patients with Acute Bacterial Skin and Skin Structure Infections", Antimicrobial Agents and Chemotherapy, US, (May 2013), vol. 57, No. 5, doi:10.1128/AAC.02106-12, ISSN 0066-4804, pp. 2087-2094, XP055287601.

Proctor and Farquhar, "Dysmenorrhoea", Clin Evid, 9, p. 1994-2013 (2003).

Radtke, J. et al., "The Menopause-Specific Quality of Life (MENQOL) Questionnaire: Psychometric Evaluation among Breast Cancer Survivors", Menopause, vol. No 18, Issue No. 3, Mar. 2011, pp. 289-295.

Rodstrom et al., "A longitudinal study of the treatment of 25 hot flushes: the population study of women in Gothenburg during a quarter of a century," (2002) Menopause, vol. 9(3), pp. 156-161.

Rosenbaum et al., "Inhibition of ovulation by a novel progestogen (drospirenone) alone or in combination with ethinylestradiol", Euro. J. Contracept. & Repro. Health Care, 5(1):14-24 (2000).

Rosing et al., "Oral contraceptives and venous thrombosis: different sensitivities to activated protein C in women using second- and third-generation oral contraceptives", Br J Haematol., 97(1), p. 233-238.

Santoro, "Symptoms of menopause: hot flushes," (2008) Clin Obstet Gynecol, vol. 51(3), pp. 539-548.

Sarfaraz, Handbook of Pharmaceutical Manufacturing Formulations Compressed Solid Products, Second edition, vol. 1, 2009.

Savjani et al., "Drug solubility: importance and enhancement techniques", ISRN Pharm., 2012: 195727.

Shulman, "Estelle, Estetrol: changing hormones in advancing oral contraception," Presented at Eur. Soc. Contraception & Reprod. Health, 14th Cong, 2nd Global Conf. (May 5, 2016).

Sidney et al., "Recent combined hormonal contraceptives (CHCs) and the risk of thromboembolism and other cardiovascular events in new users", Contraception, 87(1), p. 93-100 (2013).

Simon et al., "Menopausal hormone therapy for vasomotor symptoms: balancing the risks and benefits with ultra-low doses of estrogen," (2007) Expert Opin Investig Drugs, vol. 16(12), pp. 2005-2020.

Simoni et al., "The Discovery of Estrone, Estriol, and Estradiol and the Biochemical Study of Reproduction. The Work of Edward Adelbert Doisy", J. Biol. Chem, vol. 277, No. 28, e17, 2002, 2 pages.

Spitzer et al., "Third generation oral contraceptives and risk of venous thromboembolic disorders: an international case-control study. Transnational Research Group on Oral Contraceptives and the Health of Young Women", BMJ, 312(7023), p. 83-88 (1996).

Stanczyk, F. et al., "Progestogens used in postmenopausal hormone therapy: differences in their pharmacological properties, intracellular actions, and clinical effects", Endocrine Reviews, vol. No. 34, Issue No. 2, Apr. 2013, pp. 171-208.

Strickley et al., "Solubilizing Excipients in Oral and Injectable Formulations," Pharmaceutical Research, Springer New York LLC, US, vol. 21, No. 2, (Feb. 1, 2004), doi:10.1023/B:PHAM.0000016235. 32639.23, ISSN 0724-8741, pp. 201-230, XP009035738.

Strowitzki et al., "Efficacy of ethinylestradiol 20 ug/drospirenone 3 mg in a flexible extended regimen in women with moderate-to-severe primary dysmenorrhea: an open-label, multicenter, ramdomized, controlled study," J. Fam. Plann. Reprod. Health Care (2012) vol. 38, pp. 94-101.

Sundell et al., "Factors influencing the prevalence and severity of dysmenorrhoea in young women.", Br J Obstet Gynaecol, 97(7), p. 588-594.

Tchaicovski and Rosing, "Mechanisms of estrogen-induced venous thromboembolism", Thromb Res., 126(1):5-11.

The American College of Obstetricians and Gynecologists, "Committee Opinion No. 540: Risk of Venous Thromboembolism Among Users of Drospirenone-Containing Oral Contraceptive Pills", Nov. 2012, 4 pages.

The European Agency for the Evaluation of Medicinal Products, "CPMP Public Assessment Report—Combined oral contraceptives and venous thromboembolism", Sep. 2001, 7 pages.

Tulchinsky D et al. "Plasma Estetrol as an Index of Fetal Well-being," Clin Edoctrinol Metab, vol. 40, pp. 560-567 (1975).

U.S. Department of Health & Human Services—National Institutes of Health—National Center for Advancing Translational Sciences, "Estetrol Monohydrate", retrieved from https://drugs.ncats.io/substance/KC3GI9UM9V (First Approved in 2001).

U.S. Department of Health and Human Services—Food and Drug Administration—Center for Drug Evaluation and Research (CDER), "SUPAC: Manufacturing Equipment Addendum: Guidance for Industry", Pharmaceutical Quality/CMC, Dec. 2014, 33 pages.

Utian et al., "Comparative controlled trial of a novel oral estrogen therapy, estradiol acetate, for relief of menopause symptoms," (2005) Menopause, vol. 12(6), pp. 708-715.

Visser et al., "Clinical applications for estetrol," Journal of Steroid Biochemistry and Molecular Biology 114 (2009) 85-89.

Vlieg et al., "The venous thrombotic risk of oral contraceptives, effects of oestrogen dose and progestogen type: results of the MEGA case-control study", BMJ, 2009, 339:b2921, 8 pages.

Williams et al., "Strategies to address low drug solubility in discovery and development," (2013) Pharmacological Reviews, vol. 65(1), pp. 416-445.

Winkler et al., "Cycle control, quality of life and acne with two low-dose oral contraceptives containing 20 microg ethinylestradiol", Contraception, 96(6), 2004, pp. 469-476.

Wong et al., "Oral contraceptive pill as treatment for primary dysmenorrhoea", Cochrane Database Syst Rev., CD002120, 2009.

WTO, "Venous thromboembolic disease and combined oral contraceptives: results of international multicentre case-control study", Lancet, 346(8990), p. 1575-1582 (1995).

Ylikorkala and Dawood, "New concepts in dysmenorrhea", Am J Obstet Gynecol, 130(7), 1978, p. 833-847.

Zhang and Wan Po, "Efficacy of minor analgesics in primary dysmenorrhoea: a systematic review", Br J Obstet Gynaecol, vol. 130, Issue No. 7, Jul. 1998, pp. 780-789.

Estetra, "Cycle Control Assessment of a Combined Oral Contraceptive Containing Estetrol and a Progestin P1 or P2 (FIESTA)," ID NCT01221831, clinicaltrials.gov, Sep. 14, 2012.

Letter from FDA to Mayne Pharma LLC dated Apr. 28, 2025, regarding NDA 214154 and "presentation for NEXTSTELLIS promotional programs with speaker notes" (PM-US-NEX-0360) (speaker deck) for NEXTSTELLIS (drospirenone and estetrol tablets), for oral use.

Mayne Pharma LLC, "presentation for NEXTSTELLIS promotional programs with speaker notes" (PM-US-NEX-0360) (speaker deck) for NEXTSTELLIS (drospirenone and estetrol tablets), for oral use, Apr. 2024.

Bianchi, "The Anti-Inflammatory Effects of Testosterone," J. Endocrine Soc., 3(1): 91-107 (2019), doi: 10.1210/js.2018-00186 (avail online Oct. 22, 2018).

Office Action dated Jul. 8, 2025, in Japanese Application No. 2022-562639.

Sedlak at al., "Sex Hormones and the QT Interval: A Review," J. Women's Health 21(9): 933-41(2012), DOI: 10.1089/jwh.2011. 3444.

\* cited by examiner

CONTRACEPTIVE COMPOSITIONS WITH REDUCED ADVERSE EFFECTS

CROSS-REFERENCE TO RELATED APPLICATIONS

The present application is a continuation of International Application No. PCT/EP2021/059890, filed Apr. 16, 2021, and claims priority to European Patent Application No. 20169870.1, filed Apr. 16, 2020.

FIELD OF THE INVENTION

The present invention relates to oral contraceptives. In particular, the invention relates to combined oral contraceptives comprising estetrol and a progestogenic component such as drospirenone that display a favorable pharmacokinetic progestogenic profile with reduced adverse effects. The invention also relates to contraceptive methods and uses thereof.

BACKGROUND

Over time, numerous contraceptives have been developed and allowed women to have increase freedom and reproductive authority (Liao and Dollin, Half a century of the oral contraceptive pill, Can Fam Physician. 2012). One class of contraceptives that is particularly popular among women worldwide is the group of Combined Oral Contraceptives (COCs). These COCs typically contain a combination of an estrogen and a progestin and are often preferred over progestin-only pills that are characterized by very stringent daily administration timings and unpredictable bleeding patterns. Initially, COCs contained a high dose of estrogen (>50 μg) and a progestogen such as norethindrone, lynestrenol, ethynodiol diacetate, norethynodrel, and norethisterone (i.e. first generation COCs), leading to a considerable risk for adverse effects including cardiovascular effects. Driven by continued research and post-marketing safety evaluations, more recent COC formulations have been developed, including COCs combining ethinylestradiol (typically <50 μg) and testosterone-derived progestins such as norgestrel and levonorgestrel (i.e. second generation COCs), and COCs combining ethinylestradiol with levonogestrel-derived progestins including desogestrel or gestodene (i.e. third generation COCs). More recently a fourth generation of COCs was developed that combine drospirenone as the progestin component with ethinylestradiol. This more recently developed generation of progestins binds more specifically to the progesterone receptor, thereby reducing the androgenic, estrogenic, or glucocorticoid related side-effects, showing a more neutral effect on metabolic parameters (Bastianelli et al., Pharmacodynamics of combined estrogen-progestin oral contraceptives: 1. Effects on metabolism, Expert Rev Clin Pharmacol, 2017).

Nevertheless, it has been reported that the use of fourth generation COCs entails an increased risk for adverse effects including venous thromboembolic events when compared to second generation COCs (Dinger et al., Risk of venous thromboembolism and the use of dienogest- and drospirenone-containing oral contraceptives: results from a German case-control study, J Fam Plann Reprod Health Care. 2010). In addition, there have been reports that fourth generation COCs in particular contribute to a QT interval lengthening in subjects caused by both a QT lengthening effect of estrogens and a QT lengthening effect of drospirenone (Sedlak et al., Sex hormones and the QT interval: a review, J Womens Health, 2012). QT prolongation reflects a delayed ventricular repolarization and is associated with the development of aberrant heart rhythms, or even the occurrence of a sudden cardiac arrest event. Furthermore, the overall anti-androgenic effects of COCs are causative for a decrease in free testosterone, a phenomenon that is attributed in the art mainly to the inclusion of potent estrogens in the preparation. Low free testosterone levels have been correlated with female sexual dysfunction including but not limited to a lack or sexual desire (de Castro Coelho and Barros, The Potential of Hormonal Contraception to Influence Female Sexuality, Int J Reprod Med, 2019). Free testosterone has also been reported to have a general shortening effect on the QT interval (Sedlak et al., Sex hormones and the QT interval: a review, J Womens Health, 2012). Finally, an increase in C-reactive protein, an inflammation marker, has been observed in subjects using COCs. C-reactive protein is the most extensively studied biomarker of inflammation in atherosclerotic cardiovascular disease (ASCVD). Multiple epidemiologic studies agree on the significant association between elevated serum or plasma concentrations of C-reactive protein and the prevalence of underlying atherosclerosis, increased risk of recurrent cardiovascular events among patients with established disease, and an increased incidence of first cardiovascular events among individuals at risk for atherosclerosis (Crea and Morrow, C-reactive protein in cardiovascular disease, UpToDate, 2019). Whether C-reactive protein is a nonspecific marker indicating an acute phase response to inflammatory stimuli, or whether C-reactive protein is a direct participant in the clinical image of atherosclerosis remains unclear to date.

Estetrol is a native estrogen that is produced during pregnancy (Holinka et al., Estetrol: a unique steroid in human pregnancy, J Steroid Biochem Mol Biol, 2008). The use of estetrol in combination with the progestogen drospirenone, resulted in a good ovulation inhibition with a favorable vaginal bleeding profile, good tolerability, and high user satisfaction (Apter et al., Estetrol combined with drospirenone: an oral contraceptive with high acceptability, user satisfaction, well-being and favourable body weight control, Eur J Contracept Reprod Health Care, 2017).

Taken together, while developments in the field of COCs have led to COCs with less adverse effects, there remains an unmet need in the art to address certain side effects associated with COCs, especially with fourth generation COCs. In particular there is a need to address and avoid QT prolongation, avoid an increase in C-reactive protein levels, and avoid reduction of free testosterone in subjects.

SUMMARY

The inventors have unexpectedly observed that estetrol/drospirenone (E4/DRSP) COCs having compositions as described herein display numerous previously unknown benefits when compared to currently available combined oral contraceptives, in particular when compared to fourth generation oral contraceptives, the latter being generally considered in the art as the most advanced generation of COCs. Hence, the E4/DRSP COCs as described herein are developed in response to the clear unmet need in the art, being the provision of drospirenone-containing COCs with minimal adverse side effects. The invention therefore provides the following aspects:

Aspect 1. A contraceptive kit comprising one or more packaging units wherein each packaging unit comprises 21 to 28 daily active dosage units of a combined oral contraceptive (COC), and wherein each daily active dosage unit comprises:
  (a) drospirenone (DRSP) as progestogenic component in an amount of between 1 mg to 5 mg; and
  (b) estetrol (E4) as estrogenic component in an amount of between 10 mg and 20 mg;
  wherein, said dosage units, when orally administered daily, provide the following pharmacokinetic profile for DRSP in blood plasma:
    (i) a geometric mean $AUC_{0-24}$ of DRSP between about 150 ng·h/ml and about 1000 ng·h/ml; and/or
    (ii) a geometric mean $C_{max}$ of DRSP between about 10 ng/ml about 100 ng/ml.
  More specifically in such a kit, for a typical dose of DRSP of about 3 mg (2.5 to 3.5 mg) the
    (i) geometric mean $AUC_{0-24}$ of DRSP would be between about 200 ng·h/ml and about 600 ng·h/ml; and/or
    (ii) geometric mean $C_{max}$ of DRSP would be between 20 ng/ml and about 50 ng/ml.

More particularly, the invention provides for an amount of between 10 mg and 20 mg of estetrol as the estrogenic component of a daily active dosage unit in a contraceptive kit comprising one or more packaging units each comprising 21 to 28 daily active dosage units of a combined oral contraceptive (COC) having drospirenone (DRSP) as progestogenic component in an amount of between 1 mg to 5 mg,
  for use in providing the following pharmacokinetic profile for drospirenone in blood plasma when administered daily:
    (i) a geometric mean $AUC_{0-24}$ of drospirenone between about 150 and about 1000 ng·h/ml; and/or
    (ii) a geometric mean $C_{max}$ of drospirenone between about 10 ng/ml and 100 ng/ml, preferably wherein one or more adverse effects of DRSP are reduced compared to a subject under use of COC comprising an equivalent effective amount of DRSP and another estrogen.
  More specifically in said use, for a typical dose of DRSP of about 3 mg (2.5 to 3.5 mg) the
    (i) geometric mean $AUC_{0-24}$ of DRSP would be between about 200 ng·h/ml and about 600 ng·h/ml; and/or
    (ii) geometric mean $C_{max}$ of DRSP would be between 20 ng/ml and about 50 ng/ml.

Aspect 2. The contraceptive kit, or the amount of between 10 mg and 20 mg of estetrol, according to aspect 1, for use in reducing side effects of DRSP in a subject under use of a COC comprising an equivalent effective amount of DRSP and another estrogen, preferably a COC comprising an equivalent effective amount of DRSP and ethinyl-estradiol (EE).

Aspect 3. The contraceptive kit, or the amount of between 10 mg and 20 mg of estetrol, according to aspect 1 or 2, wherein the pharmacokinetic profile for DRSP in blood plasma is the steady state pharmacokinetic profile, preferably the steady state pharmacokinetic profile after 10 daily doses, more preferably after 14 daily doses.

Aspect 4. The contraceptive kit, or the amount of between 10 mg and 20 mg of estetrol, according to any one of aspects 1 to 3, for use in reducing the decrease of free testosterone in blood serum associated with the use of a COC comprising an equivalent effective amount of DRSP and another estrogen, preferably a COC comprising an equivalent effective amount of DRSP and EE, in a subject.

Aspect 5. The contraceptive kit, or the amount of between 10 mg and 20 mg of estetrol, according to aspect 4, wherein said decrease is reduced by 10%, preferably by 15%, more preferably by 20%, in said subject using the COC defined in aspect 1 when compared to a subject using a COC comprising an equivalent effective amount of DRSP and another estrogen, preferably a COC comprising an equivalent effective amount of DRSP and EE.

Aspect 6. The contraceptive kit, or the amount of between 10 mg and 20 mg of estetrol, according to aspects 4 or 5, wherein the free testosterone blood serum concentration level is at least 25%, preferably at least 40%, more preferably at least 50% of a baseline value, wherein said baseline value is the free testosterone blood serum expression level in said subject before using a COC comprising DRSP.

Aspect 7. The contraceptive kit, or the amount of between 10 mg and 20 mg of estetrol, according to any one of aspects 4 to 6, wherein the free testosterone blood serum concentration is at least 0.09 ng/dL, preferably at least 0.20 ng/dL in said subject when using the COC comprising DRSP and E4 as defined in aspect 1.

Aspect 8. The contraceptive kit, or the amount of between 10 mg and 20 mg of estetrol, according to any one of aspects 1 to 3, for use in reducing the risk of a prolonged QT interval associated with the use of a COC comprising DRSP in a subject, preferably by reducing the risk of prolongation of the mean and/or median QT interval by more than 5 ms.

Aspect 9. The contraceptive kit, or the amount of between 10 mg and 20 mg of estetrol, according to aspect 8, wherein said risk for said subject to experience QT interval prolongation is reduced by 10%, 25%, preferably by 50%, more preferably by 90%, or 100%, in said subject using said COC when compared to a subject using a COC comprising EE as estrogenic component and an equivalent effective amount of DRSP.

Aspect 10. The contraceptive kit, or the amount of between 10 mg and 20 mg of estetrol, according to aspects 8 or 9, wherein a QT interval is considered prolonged when the time between the start of the Q wave and the end of the T wave in an electrocardiogram of a subject is prolonged by at least 5 milliseconds when compared to the QT interval of said subject prior to using a COC comprising DRSP.

Aspect 11. The contraceptive kit, or the amount of between 10 mg and 20 mg of estetrol, according to any one of aspects 8 to 10, wherein the mean QT interval prolongation in a subject using said COC is 20%, preferably 35%, more preferably 50% shorter than a subject using a COC comprising an equivalent effective amount of DRSP as progestogenic component and EE as estrogenic component.

Aspect 12. The contraceptive kit, or the amount of between 10 mg and 20 mg of estetrol, according to any one of aspects 8 to 11, wherein the E4 inhibits QT interval prolongation in a subject using said COC as defined in aspect 1, by counteracting DRSP-induced QT interval lengthening.

Aspect 13. The contraceptive kit, or the amount of between 10 mg and 20 mg of estetrol, according to any one of aspects 8 to 12, wherein said COC has reduced estrogenic-related effects on the QT interval when compared to a subject using a COC comprising an equivalent effective amount of DRSP as progestogenic component and EE as estrogenic component.

Aspect 14. The contraceptive kit, or the amount of between 10 mg and 20 mg of estetrol, according to aspect 13, wherein the estrogenic related effect is a prolongation of the QT interval, preferably prolongation of the QT interval by estrogenic-mediated suppression of $I_{Kr}$ and/or $I_{Ks}$, and/or $I_{K1}$ channel currents.

Aspect 15. The contraceptive kit, or the amount of between 10 mg and 20 mg of estetrol, according to any one of aspects 1 to 3, for use in reducing or preventing elevated C-reactive protein concentration blood serum levels associated with the use of a COC comprising DRSP in a subject.

Aspect 16. The contraceptive kit, or the amount of between 10 mg and 20 mg of estetrol, according to aspect 15, wherein said C-reactive protein blood serum concentration level is considered elevated when said level is 10% higher, preferably 20% higher, preferably 30% higher than a baseline value, wherein said baseline value is the C-reactive protein blood serum concentration level in said subject before using a COC comprising DRSP.

Aspect 17. The contraceptive kit, or the amount of between 10 mg and 20 mg of estetrol, according to according to aspects 15 or 16, wherein the C-reactive protein blood serum concentration level is less than 2.00 mg/L, preferably less than 1.75 mg/L, more preferably less than 1.5 mg/L, in said subject when using the COC comprising DRSP and E4 as defined in aspect 1.

Aspect 18. The contraceptive kit, or the amount of between 10 mg and 20 mg of estetrol, according to any one of aspects 1 to 17, wherein said COC comprising DRSP and E4 as defined in aspect 1 is administered in periodic cycles, wherein optionally said administration scheme includes an administration-free interval of from 4 to 7 days, or comprises the administration of a placebo during said 4 to 7 days.

Aspect 19. The contraceptive kit, or the amount of between 10 mg and 20 mg of estetrol, according to any one of aspects 1 to 18, wherein the E4 is present in said COC as defined in aspect 1 at an amount of from 12 mg to 18 mg, preferably from 14 to 16 mg, such as about 15 mg. In further embodiments and in relation to all aspects defined herein, the E4 can be present in the E4/DRSP COC described herein at an amount of from 14.2 to 15.5 mg. In yet further embodiments, the estetrol (E4) can be estetrol monohydrate which is present in the E4/DRSP COC described herein at an amount of from about 14.5 mg to about 15.5 mg, preferably about 15 mg. In alternative further embodiments, the estetrol (E4) can be anhydrous (i.e. water-free) estetrol which is present in the E4/DRSP COC described herein at an amount of from about 14 to 15 mg, preferably about 14.2 mg.

Aspect 20. The contraceptive kit, or the amount of between 10 mg and 20 mg of estetrol, according to any one of aspects 1 to 19, wherein the DRSP is present in said COC as defined in aspect 1 at an amount from 2.5 and 3.5 mg, more preferably at an amount of about 3 mg.

Aspect 21. The contraceptive kit, or the amount of between 10 mg and 20 mg of estetrol, according to any one of aspects 1 to 20, wherein a single dosage unit of said COC as defined in aspect 1 comprises about 2.5 to 3.5 mg DRSP and about 14 to 16 mg of an E4 component.

Aspect 22. A composition comprising E4 for use in reducing the bioavailability of DRSP in a subject under use of a combined oral contraceptive comprising DRSP.

Aspect 23. The E4 composition for use according to aspect 22, wherein said E4 functions as the estrogenic component of said combined oral contraceptive and DRSP functioning as the progestogenic component.

Aspect 24. The E4 composition for use according to aspect 22 or 23, for use in reducing side effects of DRSP in a subject under continuous use of a combined oral contraceptive comprising DRSP.

Aspect 25. The E4 composition for use according to any one of aspects 22 to 24, for use in reducing the risk of elevated C-reactive protein (CRP) blood serum concentration levels associated with the continuous use of a combined oral contraceptive comprising DRSP.

Aspect 26. E4 for use in lowering the steady state bioavailability of DRSP in a COC with at least 15% as compared to COC's comprising equivalent amounts of DRSP and EE, preferably with at least 20%, more preferably with at least 25% such as about 30% or more.

Aspect 27. E4 for use in lowering the peak blood plasma concentration of DRSP in subjects continuously using COC's comprising DRSP.

Aspect 28. A method for reducing the risk of adverse effects of DRSP in a subject under a continuous regimen of a COC comprising DRSP, comprising the step of providing a COC comprising DRSP as the progestogenic component and E4 as the estrogenic component.

Aspect 29. A COC comprising E4 and DRSP for use in reducing side effects of DRSP associated with the continuous use of a combined oral contraceptive comprising DRSP. The "continuous use" implies that the dosage-regime is applied for multiple periodic cycles. Typically one periodic cycle comprises the application of 21 to 28 daily dosage units of COC comprising the active ingredients. Said use can in some cases be interrupted between the different periodic cycles for 4 to 7 days, optionally by providing placebo dosage units not comprising the active ingredients of the COC, or simply by not taking any pills for those 4 to 7 days. Typically a 21-28 dosage unit regimen of active COC ingredients is applied, interrupted by a 4 to 7 day use of placebo dosage units for compliance reasons.

Aspect 30. Use of E4 for the manufacture of a medicament for the prevention or treatment of adverse effect attributable to the use of DRSP in a COC.

Aspect 31. Use of E4 for the manufacture of a composition (i.e. medicament or contraceptive) for the prevention or treatment of QT interval prolongation in subjects using a DRSP comprising COC.

Aspect 32. Use of E4 for the manufacture of a composition (i.e. medicament or contraceptive) for the prevention or treatment of free testosterone blood serum level reduction in subjects using a DRSP comprising COC.

Aspect 33. Use of E4 for the manufacture of a composition (i.e. medicament or contraceptive) for the prevention or treatment of a C-reactive protein level increase in subjects using a DRSP comprising COC.

In any one of the above listed aspects or embodiments herein, the preferred amount of estetrol in said COC is equivalent to an amount of 14 to 16 mg of estetrol and can be present in the form of estetrol monohydrate in a range of between 14 and 16 mg, preferably in an amount of 15 mg estetrol monohydrate or its equivalent 14.2 mg estetrol.

In any one of the above listed aspects or embodiments, the preferred amount of drospirenone is said COC is equivalent to about 2 to 4 mg or from about 2.5 to 3.5 mg drospirenone.

The above and further aspects and preferred embodiments of the invention are described in the following sections and in the appended claims. The subject matter of the appended claims is hereby specifically incorporated in this specification.

DETAILED DESCRIPTION OF THE INVENTION

Figure 1:
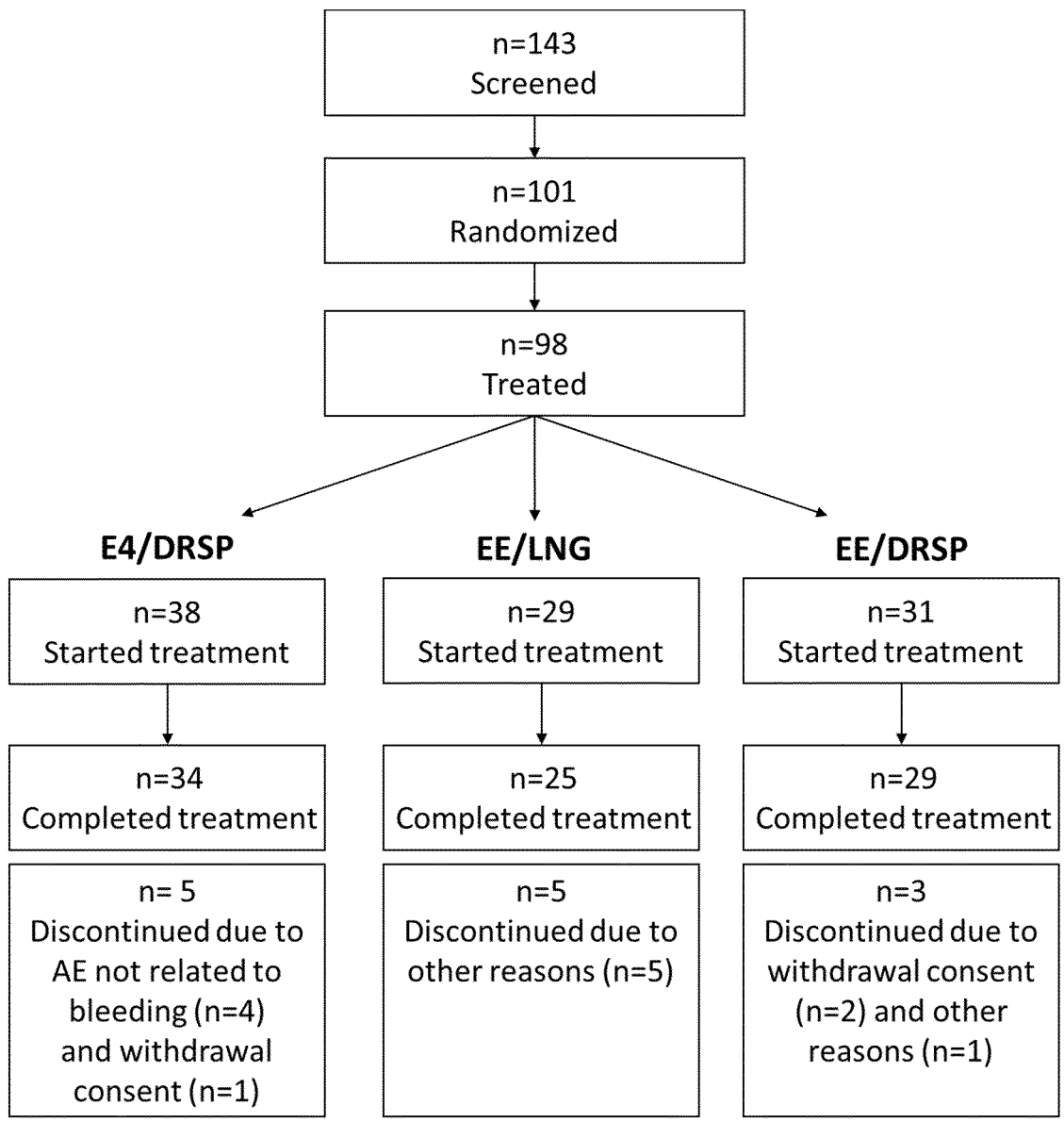
FIG. 1. Subject stratification. 98 subjects were enrolled in a treatment with E4/DRSP 15/3 mg (n=38), EE/LNG 0.03/0.15 mg (n=29), EE/DRSP 0.02/3 mg (n=31). AE: adverse effects.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms also encompass "consisting of" and "consisting essentially of", which enjoy well-established meanings in patent terminology.

The recitation of numerical ranges by endpoints includes all numbers and fractions subsumed within the respective ranges, as well as the recited endpoints. This applies to numerical ranges irrespective of whether they are introduced by the expression "from . . . to . . . " or the expression "between . . . and . . . " or another expression.

The terms "about" or "approximately" as used herein when referring to a measurable value such as a parameter, an amount, a temporal duration, and the like, are meant to encompass variations of and from the specified value, such as variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more members or at least one member of a group of members, is clear per se, by means of further exemplification, the term encompasses inter alia a reference to any one of said members, or to any two or more of said members, such as, e.g., any $\geq 3$, $\geq 4$, $\geq 5$, $\geq 6$ or $\geq 7$ etc. of said members, and up to all said members. In another example, "one or more" or "at least one" may refer to 1, 2, 3, 4, 5, 6, 7 or more.

The discussion of the background to the invention herein is included to explain the context of the invention. This is not to be taken as an admission that any of the material referred to was published, known, or part of the common general knowledge in any country as of the priority date of any of the claims.

Throughout this disclosure, various publications, patents and published patent specifications are referenced by an identifying citation. All documents cited in the present specification are hereby incorporated by reference in their entirety. In particular, the teachings or sections of such documents herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the invention. When specific terms are defined in connection with a particular aspect of the invention or a particular embodiment of the invention, such connotation or meaning is meant to apply throughout this specification, i.e., also in the context of other aspects or embodiments of the invention, unless otherwise defined. For example, embodiments directed to products are also applicable to corresponding features of methods and uses.

In the following passages, different aspects or embodiments of the invention are defined in more detail. Each aspect or embodiment so defined may be combined with any other aspect(s) or embodiment(s) unless clearly indicated to the contrary. In particular, any feature indicated as being preferred or advantageous may be combined with any other feature or features indicated as being preferred or advantageous.

Reference throughout this specification to "one embodiment", "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, alternative combinations of claimed embodiments are encompassed, as would be understood by those in the art.

The term "subject", or "patient" as used herein refers to animals, preferably warm-blooded animals, more preferably vertebrates, most preferably mammals such as humans and non-human mammals. Particularly preferred are female human subjects, more preferably pre- and/or post-menopausal female subjects. The female subject envisaged herein may be subjects in need of, or deemed in need of the contraceptive as described herein, or an estetrol-comprising composition as described herein, for contraceptive reasons, for improving bleeding patterns (i.e. achieving a less severe or less irregular bleeding pattern), for improving hormone-induced mental or physical changes, or for any combination thereof.

A skilled person is aware that terms such as "quantity", "amount" and "level" are synonyms and have a well-defined meaning in the art. The terms as used herein may particularly refer to an absolute quantification of a molecule such as a steroid, in (a sample taken from) a subject, or to a relative quantification of a molecule or analyte in a sample, i.e., relative to another value such as relative to a reference value as taught herein, or to a range of values indicating a base-line of a certain parameter.

These values or ranges of values may be obtained from one single subject or from a group of subjects (i.e. at least two subjects). Further, when reference is made to (absolute or relative) quantities of parameters such as AUC or $C_{max}$, these amounts are to be interpreted as the quantity as measured in (a sample of) the blood plasma of one or more subjects. Alternatively, when reference is made to (absolute or relative) quantities or concentrations of parameters such as free testosterone and C-reactive protein, these amounts are to be interpreted as the quantity as measured in (a sample of) blood serum of one or more subject. Both "blood plasma" and "serum plasma" are generally accepted terms in medicinal and clinical contexts and leave no ambiguity with respect to their interpretation to a skilled person (Matthew and Varacallo, Physiology, blood plasma, StatPearls, 2019).

"Estetrol", or short "E4" is an estrogen steroid produced by the fetal human liver (PubChem CID: 27125). Estetrol may be described as a 3-hydroxy steroid corresponding to 17beta-estradiol wherein the 15α and 16α positions are substituted for two additional hydroxy groups. It is known that estetrol is an estrogen receptor agonist (Coelingh Bennink et al., Estetrol review: profile and potential clinical applications, Climacteric, 2008). Estetrol as indicated herein may be endogenous estetrol. Alternatively, the estetrol may be chemically synthesized, synthesized by the use of (mutant) recombinant enzymes, or synthesized by any combination thereof. Estetrol may alternatively be indicated in the art by its molecular formula: C18H24O4, or by structural formula (I):

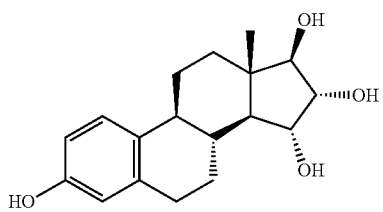

Formula (I)

It is understood that when estetrol is mentioned throughout any section of this specification, any estetrol-containing component (i.e. compound) and/or estetrol derivative is also intended. Non limiting examples include estetrol esters and estetrol hydrates. In preferred embodiments, when present, the estetrol comprised in the COCs disclosed herein is estetrol monohydrate.

The terms "progestogen", "progestogen", "gestagen", or "gestogen" and derived hereof "progestinogenic compounds" as used both herein and in the art refer to any molecule that produces effects similar to those of the natural female sex hormone progesterone in the body of a subject. Progestogens are considered to be agonists of the progesterone receptors and their functions have been thoroughly examined in the art (inter alia discussed in Kuhl, Pharmacology of estrogens and progestogens: influence of different routes of administration, Climateric, 2005). Progestins are a subgroup of progestogens that comprise synthetic progestogens. While the above terms may be used interchangeably in the art, there is a general understanding that when progestin is mentioned, synthetic progestogens are meant. "Drospirenone" (abbreviated as DRSP, PubChem CID: 68873) is an example of a progestin and enjoys a widespread use in COCs due to its antimineralocorticoid and antiandrogenic activity combined with a general low off-target activity. In general, drospirenone-containing COCs are referred to as fourth generation COCs. Non-limiting examples of commercially available COCs comprising drospirenone are known as "Yaz™" and Yasmin™. An illustrative example of a drospirenone only progestogen pill is "Slynd™", which is also commercially available. Drospirenone may be alternatively be indicated in the art by its molecular formula $C_{24}H_{30}O_3$, or by the structural formula (II):

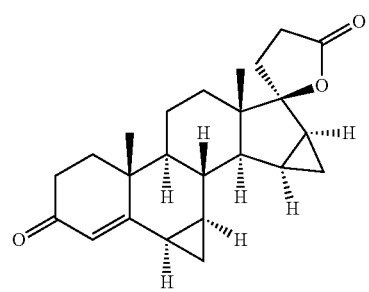

Formula (II)

It is understood that when the term "drospirenone" is used herein, any drospirenone derivatives are also envisaged. It is furthermore generally accepted that in a COC, a drospirenone dosage of 2.5 to 3.5 mg per day, preferably about 3 mg per day is needed to achieve ovulation inhibition.

By means of illustration and not limitation, other progestogens or progestins that have been used in COCs include norethisterone, norethindrone, levenogestrel (LNG), norgestrel, gestodene, desogestrel, norgestimate, cyproterone acetate, dienogest, and chlormadinone.

"Combined Oral Contraceptives", abbreviated herein as COCs indicate any oral contraceptive that comprises both estrogenic and progestogenic molecules, and that the COC hence achieves a clinical effect based on the combined activity of said estrogen and progestogen. COCs are typically classified based on the progestogen they contain. $1^{st}$ generation COCs comprise progestogens such as norethynodrel, norethindrone, lynestrenol, ethynodiol diacetate, or norethisterone. $2^{nd}$ generation COCs comprise progestogens such as levonorgestrel, or norgestrel. $3^{rd}$ generation COCs include desogestrel, gestodene, or norgestodene. $4^{th}$ generation COCs comprise drospirenone as progestogenic component. Numerous COCs have been developed and made commercially available, such as Yaz™. It is evident to a skilled person that throughout this specification, when reference is made to "a (the) E4/DRSP COC" or "a (the) COC as described herein" in this specification a COC is intended that comprises as estrogenic compound estetrol and comprising as progestogenic compound drospirenone, unless explicitly stated otherwise. Comparison is made herein of COCs having as estrogenic component estetrol and progestogenic component drospirenone to COCs having drospirenone or levonogestrel (LNG) as progestogenic component and ethinylestradiol (EE) as estrogenic component. Non-limiting examples hereof are products available under the commercial names Yaz™ (0.02 mg EE/3 mg DRSP), Yasmin™ (0.03 mg EE/3 mg DRSP), or Melleva™ (0.03 mg EE/0.15 mg LNG). Most preferably the COCs as described herein (i.e. comprising both E4 and DRSP) are compared to COCs comprising about 0.02 or about 0.03 mg ethinylestradiol and about 3 mg drospirenone. EE/DRSP "Contraceptive kit" refers to any package comprising packaging units of a contraceptive, preferably in the context of the invention packaging units of a COC. A skilled person is aware that contraceptive kits may be devised that are variable in size, shape and the number of packaging units and/or dosage units it contains. Contraceptive kits may comprise an information leaflet in and/or instructions printed on said kit. "Active dosage unit" used herein may interchangeably be used with the term "dosage dorms" and refer to pharmaceutical drug products having a specific mixture of active ingredients (in the context of COCs specific amounts of an estrogen and a progestogen) that is contained in a particular configuration, non-limiting examples hereof being capsules and tablets. It is evident that in the context of COCs the active dosage unit needs to be (deemed) suitable for oral administration.

Since the herein disclosed COC is intended for oral administration, configurations that provide an ease of oral administration are preferred. Hence, a daily dosage unit as described herein may be solid or semi-solid dosage form. Suitable yet non-limiting examples are tablets, (soft or hard) capsules, cachets, granules, pills, pellets, cachets, buccal films, pastes, crystals, dissolving films, caplets, meltlets, and the likes. Evidently, certain oral dosage forms such as capsules may comprise an aqueous or oily solution comprising the estetrol and drospirenone. For each of these dosage formulations, suitable production methods have been disclosed in the art. Illustrative examples of tablet, caplet, and meltlet production methods are wet granulation (i.e. steam granulation, moisture-activated dry granulation, moist granulation, thermal adhesion granulation, melt granulation, freeze granulation, foam granulation, or reverse wet granulation), dry granulation such as pneumatic dry granulation, or compression (Shanmugam, Granulation techniques and technologies: recent progresses, Bioimpacts, 2015). Hard capsule shells may be made by dip-molding or injection molding techniques, while an exemplary manufacturing method of soft capsules is formation of a heat seal between two ribbons of gelatin. Both hard and soft capsules have been thoroughly evaluated and discussed in the art (e.g. in the reference book of Augsburger and Hoag, Pharmaceutical dosage forms: Capsules, CRC press, 2017).

By the wording "under use of", "using", and similar expressions that are used throughout the specification, said wording is used to specify one or more subjects that have at least used once the COC or active ingredient to which reference is made in that sentence or paragraph. In preferred embodiments, under use may be interpreted as "under continuous use", or "an uninterrupted successive period cycles of administration". In certain embodiments wherein reference is made to a subject using or having used a COC comprising drospirenone, the subject has used a COC comprising drospirenone for at least 1 administration cycle, preferably at least 2, at least 3, at least 4, at least 5, at least 6, or more than 6 administration cycles.

Several surprising and valuable findings are described herein that originate from the results of several studies by the inventors. In essence, the inventors have found that several of the above-mentioned side effects of COCs having as progestogenic component drospirenone can be mediated, either in partial or in full, by using estetrol (E4) as the estrogenic component of said COC rather than ethinylestradiol (EE). Hence, these findings hold substantial value for the field of COCs. The merits of the COCs described herein therefore include reduced risks for adverse effects, reflected by an improvement of several molecular parameters that are indicative for said adverse effects. An immediate effect can therefore be summarized as an improvement of the health of subjects using COCs. A second effect of a reduction in incidence of adverse effects of COCs is that improved user compliance will be achieved in subjects using COCs. Over time, these findings will mark a significant contribution to risk-free female reproductive autonomy. Since the inclusion of drospirenone in fourth generation COCs is omnipresent, the industrial applicability of the uses, methods, and compositions described herein are self-evident.

In a first finding, the inventors have observed that subjects using an E4/DRSP COC have significant less decrease in blood serum free testosterone levels which can be typically observed in subjects using COCs comprising drospirenone, such as EE/DRSP COCs. More particularly, the typical reduction, or "drop", in blood serum free testosterone observed in subjects taking EE/DRSP COCs is markedly reduced in subject taking E4/DRSP COCs. It has been described in the art that drospirenone is responsible for a reduction in blood serum free testosterone, since drospirenone is an progesterone receptor agonist, and progesterone receptor activation results in an antigonadotropic and antiestrogenic effect (Kuhl et al., Pharmacology of estrogens and progestogens: influence of different routes of administration, Climacteric, 2005). One of the antigonadotropic effects of drospirenone is the suppression of gonadal sex hormone production, which includes estradiol, progesterone, and testosterone production. Hence, the reduction in testosterone production is a direct consequence of drospirenone, as would be also understood by a skilled person. However, surprisingly, when replacing ethinylestradiol in EE/DRSP COCs with estetrol, the reduction in free testosterone in COC-using subject was significantly reduced. This is the first observation showing that estetrol has a beneficial (clinical) effect on the free testosterone concentrations in subjects that use COCs comprising drospirenone while still providing a satisfactory contraceptive effect. The improved testosterone levels contribute to a reduction in frequently reported side effects in said subjects, such as a lack of sexual desire, low libido, and lack of arousal. This effect of E4/DRSP COCs has not been described in the art. In a related observation, the inventors have observed that using E4/DRSP COCs does not increase, or does not have a tendency to increase, QT intervals of subjects using COCs that comprise drospirenone. The impact of known COCs on the prolongation of the QT interval of subject has been debated in the art (reference is made to Salem et al. (2016) and Sedlak et al. (2012), both cited herein. The overall influence of sex hormones on prolongation of the QT interval is the result of a complex interplay between testosterones, progestogens, and estrogens due to opposing effects on ion (potassium) channels in myocytes. In general, there is a consensus in the art that both endogenous and exogenous sex hormones influence the QT interval. As COCs comprise substantial amounts of progestogens and estetrol significant changes on the QT interval can sometimes be observed. In general, testosterone and progestogens appear to shorten the action potential, and therefore have a beneficial effect on the QT interval prolongation. In contrast, estrogens appear to have a lengthening effect on the QT interval. Furthermore, it has been formulated that during menstrual cycles, progestogens are the dominant factor that impact ventricular repolarization in women. However, drospirenone does not behave as a typical progestogen and instead seems to provoke QT prolongation strengthening the effect of estrogens on the QT interval prolongation instead of counteracting it (Salem et al., Association of Oral Contraceptives With Drug-Induced QT Interval Prolongation in Healthy Nonmenopausal Women, JAMA Cardiol, 2018). Therefore the following summarization of the impact of different contraceptives is accepted in the art (taken from Sedlak et al. (2012)):

|  | Estrogen effect on QT | Progestin effect on QT | Overall effect on QT |
|---|---|---|---|
| 1$^{st}$ generation COC | ↑↑ | ↓↓↓ | ↓ |
| 2$^{nd}$ generation COC | ↑ | ↓ | ↔/↓ |

| | Estrogen effect on QT | Progestin effect on QT | Overall effect on QT |
|---|---|---|---|
| 3rd generation COC | ↑ | ↓ | ↔ |
| 4th generation COC | ↑ | ↑ | ↑↑ |

Based hereon, it can be deducted that 4th generation COCs (e.g. EE/DRSP COCs) have an overall lengthening effect on the QT interval. Subsequently, 4th generation COC-using subjects have a considerable risk on QT lengthening. In general, a QT interval is considered to be prolonged when the QT interval increases by at least 5 ms as may be caused by any kind of intervention such as administration or usage of a pharmaceutical active ingredient, and in particular in the context of the current disclosure the (continuous) use of a 4th generation COC. Unexpectedly, the inventors have observed that the risk of QT prolongation is mitigated by exchanging the ethinylestradiol component in a 4th generation COC for estetrol. Without being bound to any theory, the estetrol is hypothesized to contribute to this surprising effect by two molecular mechanisms. Firstly, estetrol is seems to be a more gentle estrogen when compared to ethinylestradiol and is therefore likely to have a less pronounced estrogen-related effect on QT lengthening. It has been reported that estrogens impact the QT interval on molecular level by decreasing potassium channel currents (and/or expression), and it may be that estetrol has a less pronounced influence on these channels. Secondly, as indicated above, E4/DRSP COCs are able to reduce the degree of free testosterone reduction or the degree of free testosterone suppression. Since testosterone has a shortening effect on the QT interval which is likely to be attributed to a positive contribution to ion potassium channel currents and/or expression, the drospirenone-mediated lengthening effect may be negated. Hence, by this dual action mechanism proposed above, estetrol may be able to avoid QT lengthening observed in EE/DRSP 4th generation COCs. This effect of estetrol, and by consequence of E4/DRSP COCs has not been reported in the art.

In a third unexpected observation, the inventors have observed that subjects using E4/DRSP contraceptives are less prone, or less at risk at having COC-induced elevated C-reactive protein blood serum levels compared to subjects using common 4th generation COCs such as EE/DRSP COCs. Increases in C-reactive protein (concentration) levels during and after use of COCs have been reported in the art (van Rooijen et al., Treatment with combined oral contraceptives induces a rise in serum C-reactive protein in the absence of a general inflammatory response, J Thromb Haemost, 2006) and it has been postulated that the raised C-reactive protein concentration appears to be related to a direct effect on hepatocyte C-reactive protein synthesis and does not reflect IL-6 mediated inflammation, endothelial activation, or induction of insulin resistance, although this remains debated. There is an association between elevated serum and/or plasma levels of C-reactive protein with atherosclerosis and atherosclerotic cardiovascular disease (AS-CVD). While the exact contribution of C-reactive protein remains elusive, it is clear that any elevation of C-reactive protein is to be avoided in view of the link to atherosclerosis. The reduced impact of E4/DRSP COCs on C-reactive protein elevation when compared to 4th generation COCs (e.g. EE/DRSP) have not been reported in the art.

A first aspect of the invention hence relates to a contraceptive kit comprising one or more packaging units wherein each packaging unit comprises 21 to 28 daily active dosage units of a combined oral contraceptive (COC), and wherein each daily active dosage unit comprises: (a) drospirenone as progestogenic component in an amount of between 1 mg to 5 mg; and (b) estetrol as estrogenic component in an amount of between 10 mg and 20 mg; wherein, said dosage units, when orally administered daily, provide the following pharmacokinetic profile for drospirenone in blood plasma:
 (i) a geometric mean $AUC_{0-24}$ of a dosage of respectively 1 mg to 5 mg drospirenone of between about 150 ng·h/ml and about 1000 ng·h/ml for DRSP; and/or
 (ii) a geometric mean Cmax of a dosage of respectively 1 mg to 5 mg drospirenone of between about 10 ng/ml and about 100 ng/ml.

For a typical dose of DRSP of about 3 mg (2.5 to 3.5 mg) the
 (iii) geometric mean $AUC_{0-24}$ of drospirenone would be between about 200 ng·h/ml and about 550 ng·h/ml; and/or
 (iv) geometric mean Cmax of drospirenone would be between 20 ng/ml and about 50 ng/ml.

It is understood that when the abbreviation "AUC" is used herein, that this refers to "Area Under the Curve" and is to be interpreted as it common meaning in the art, i.e. the definite integral of a curve that describes the variation of a drug concentration in blood plasma as a function of time. $AUC_{0-24}$ as used herein expresses the AUC from a time "0", being the point of administration of the COC to a subject, to a time point of 24 hours. In the context used herein, "AUC" may be interpreted as bioavailability. In accordance, AUC indicates the total AUC (time point "0" to infinite).

"$C_{max}$" as referred to herein is the maximal or peak blood plasma concentration that is reached of the drug, for example drospirenone. Unless stated otherwise, the AUC and $C_{max}$ values may be measured by radioimmunoassays, and/or HPLC and LC MS/MS, which are assays known to a person skilled in the art (for example in Jaffe, Methods of Hormone Radioimmunoassay, $2^{nd}$ edition, Academic press, 1979, and Chen and Hsu, Development of a LC-MS/MS-based method for determining metolazone concentrations in human plasma: Application to a pharmacokinetic study, J of Food and Drug Anal, 2013).

In certain embodiments, each daily active dosage unit comprises the same or about the same amounts of estetrol and drospirenone as defined herein elsewhere. In alternative embodiments, some daily active dosage units may comprise a higher or lower dose of E4 and/or DRSP as long as an equivalent level of E4 and/or DRSP is maintained during the periodic cycle. In exemplary embodiments of this alternative, the different daily dosage units may be configured for multiphasic administration (e.g. biphasic, triphasic, or quadriphasic administration), each phase reaching a slightly different concentration of E4 and/or DRSP.

In certain embodiments, the pharmacokinetic profile for drospirenone when administered in a daily dosage of about 3 mg (e.g. 2.5 to 3.5 mg) after a single dose of the COC is characterized by a geometric mean $AUC_{0-24}$ of drospirenone which is less than 425 ng·h/ml, preferably less than 400 ng·h/ml, preferably less than 350 ng·h/ml, more preferably less than 325 ng·h/ml, more preferably less than 300 ng·h/ml, more preferably less than 275 ng·h/ml, more preferably less than 250 ng·h/ml, more preferably less than 225 ng·h/ml. In certain embodiments, the pharmacokinetic profile for drospirenone after a single dose of the COC is characterized by an geometric mean $AUC_{0-24}$ of drospirenone of between 450 ng·h/ml and 200 ng·h/ml, preferably between 350 ng·h/ml and 150 ng·h/ml, more preferably between 300 ng·h/ml and 200 ng·h/ml, most preferably between 260 ng·h/ml and 220 ng·h/ml. In certain embodiments, the pharmacokinetic profile for drospirenone after a single dose of the COC is characterized by a geometric mean $C_{max}$ of drospirenone which is less than about 45 ng/ml, preferably less than 40 ng/ml, preferably less than 35 ng/ml, preferably less than 30 ng/ml. In certain embodiments, the pharmacokinetic profile for drospirenone after a single dose of the COC is characterized by a geometric mean $C_{max}$ of drospirenone which is between 20 ng/ml and 50 ng/ml, preferably between 20 ng/ml and 45 ng/ml, preferably between 24 ng/ml and 40 ng/ml, preferably between 24 ng/ml and 35 ng/ml. In certain embodiments, the pharmacokinetic profile for drospirenone after a single dose of the COC is characterized by a geometric mean $AUC_{inf}$ of drospirenone which is less than 300 ng·h/ml, preferably less than 275 ng·h/ml, preferably less than 260 ng·h/ml, preferably less than 250 ng·h/ml, preferably less than 230 ng·h/ml. In certain embodiments, the pharmacokinetic profile for drospirenone after a single dose of the COC is characterized by an geometric mean $AUC_{inf}$ of drospirenone which is between about 300 ng·h/ml and about 500 ng·h/ml, preferably between 350 ng·h/ml and about 450 ng·h/ml. In certain embodiments, the pharmacokinetic profile for drospirenone after a single dose of the COC is characterized by a geometric mean $AUC_{0-24}$ of less than 250 ng·h/ml, preferably about 224 ng·h/ml, and a geometric mean $C_{max}$ of less than 45 ng/ml, preferably less than 40 ng/ml, preferably less than 35 ng/ml, and optionally by a geometric mean $AUC_{inf}$ of less than 450 ng·h/ml. In certain embodiments, the pharmacokinetic profile for drospirenone after a single dose of the COC is characterized by a geometric mean $AUC_{0-24}$ of between about 200 ng·h/ml and about 250 ng·h/ml and a $C_{max}$ of between about 20 ng/ml and about 30 ng/ml, and optionally by a geometric mean AUC of between 350 ng·h/ml and 450 ng·h/ml.

In certain embodiments, the pharmacokinetic profile for drospirenone after multiple daily doses of about 3 mg (e.g. 2.5 to 3.5 mg) preferably after 10, 12, 14, 15, 16, 17, 18, 19, 20, 21, 22, 23, 24, 25, 26, 27, 28 daily doses of the COC is characterized by a geometric mean $AUC_{0-24}$ of drospirenone which is less than 650 ng·h/ml, preferably less than 600 ng·h/ml, preferably less than 550 ng·h/ml, preferably less than 625 ng·h/ml, and optionally by a geometric mean $C_{max}$ of less than 50 ng/ml. In certain embodiments, the pharmacokinetic profile for drospirenone after multiple daily doses, preferably after 10, 12, 14, 21, or 21 to 28 daily doses the COC is characterized by a geometric mean $AUC_{0-24}$ of drospirenone between 400 ng·h/ml and 625 ng·h/ml, preferably between 425 ng·h/ml and 550 ng·h/ml, preferably between 425 ng·h/ml and 525 ng·h/ml, and optionally by a geometric mean $C_{max}$ of less than 50 ng/ml. In certain embodiments, the pharmacokinetic profile for drospirenone after 10 daily doses is characterized by a geometric mean $AUC_{0-24}$ of drospirenone which is less than 450 ng·h/ml and a $C_{max}$ which is less than 40 ng/ml.

In certain embodiments, the pharmacokinetic profile for drospirenone after 14 daily doses is characterized by a geometric mean $AUC_{0-24}$ of drospirenone which is less than 525 ng·h/ml and a $C_{max}$ which is less than 50 ng/ml. It is understood that the values described herein are representative for subjects that are administered or administer the COCs described herein at about regular intervals, preferably wherein each interval between administrations is between 18 and 28 hours, preferably about 24 hours. The parameters described herein could be observed after a single dosage of the COC. These parameters were confirmed in in a multi-dose trial at a time point of 14 days after the start of daily administration. It is obvious that a skilled person will appreciate that other time points may be chosen once a drospirenone steady state is reached in case of a multi-dose trial. In the COC, the mean terminal elimination half-life ($t_{1/2}$) for E4 is approximately 20 to 30 hours. In the combination, the mean $t_{1/2}$ for drospirenone is approximately 30 to 40 hours. The decline of the blood plasma levels for E4 is biphasic, therefore part of the AUC is determined by a faster decline than the $t_{1/2}$ and steady state is expected before 5 half-lives. The worst case duration of reaching steady state is 5 times 56 hours (280 hours or 11.6 days). Therefore 12 days of daily administrations should suffice to reach steady state, assuming dose-linear kinetics. Steady state will be reached if trough levels are similar during the last few dosing days. Therefore, a duration of 14 days for multiple dosing is adequate to achieve a steady state of the estetrol and/or the drospirenone in the blood. In the results of the multi-dose trial explained in the examples, a steady state for estetrol when using the E4/DRSP COC as described herein was reached after about 5 daily doses and a steady state for drospirenone was reached after about 10 daily doses. Therefore, in an aspect of the invention, the pharmacokinetic profile as disclosed herein is the steady state pharmacokinetic profile. In certain embodiments, the steady state pharmacokinetic profile is the pharmacokinetic profile measured after administration of 10 daily doses. In further embodiments, the steady state pharmacokinetic profile is the pharmacokinetic profile after administration of 11, 12, 13, 14, 15, 16, 17, 18, 19, 20, 21, 22, 23, 24, 25, 26, 27, 28, or more daily doses.

In certain embodiments, the contraceptive kit comprises one packaging unit. In alternative embodiments, the contraceptive kit comprises at least two packaging units, preferably at least three, preferably more than three packaging units. In certain embodiments the packaging unit is a blister or strip. The packaging unit of the contraceptive kit disclosed herein may be a "compliance package". As known from the art, "compliance packages" are packaging units of variable sizes and formats that, next to providing a suitable storage means for one or more medicaments, within this context COCs, aim to provide assistance and/or guidance to a subject to comply with the intended periodical administration of said COCs (Peck Gossel, Packaging the Pill, Manifesting Medicine: Bodies and Machines, New York: Taylor & Francis, 1999). As a non-limiting example, the packaging unit may be provided with numerical indications and/or symbols that allow the subject to keep track of said subject's menstrual cycle. In an alternative non-limiting example, the packaging unit may comprise means to send an electronic signal to a subject when a predefined time of administration (i.e. a certain day) is reached and the COC for that time point is still contained in the packaging unit. In those examples, the electronic signal may be sent to a data storage means and/or sent to a user-defined electronic device, smartphones and smart wear begin illustrative examples hereof. In certain embodiments, distinct portions of the packaging unit(s) provide a different sensory trigger to a subject, non-limiting examples being distinct colors or roughness.

In certain embodiments, each packaging unit comprises 21, 22, 23, 24, 25, 26, 27, or 28 daily dosage units of the COC. In further embodiments each packaging unit comprises 21 to 24 daily dosage units of the COC and one or more placebo dosage units, preferably 4 to 7 placebo units. The placebo units are provided for increasing patient compliance, since having to take one pill daily is more easy to maintain than to have a certain interval between taking pills.

In certain embodiments, the order of the COC and placebo daily dosage units are arranged in a grouped manner (i.e. first 21 to 24 daily dosage units of the COC followed by 4 to 7 placebo units, or vice versa). In further embodiments, there are no indications on the packaging unit to provide information to the subject which daily dosage units are COC dosage units and which daily dosage units are placebo dosage units. In certain embodiments, the placebo dosage units comprise lactose, magnesium stearate, and starch. In further embodiments, the placebo dosage units comprise lactose monohydrate, magnesium stearate, and maize starch.

In certain embodiments, the contraceptive kit as described herein is administered in periodic cycles, wherein said cycle comprises an administration-free interval of 7 days. In further embodiments, said cycle comprises an administration-free interval of 4 days. By "administration-free interval" is herein intended a time span of 7 or 4 days wherein no COC is administered to the subject. Hence, in the administration-free interval, no estetrol or progestogen is administered to the subject. In certain embodiments, during the administration-free interval administration of a placebo formulation may occur, optionally having a visually indistinguishable appearance to the active dosage unit.

A placebo formulation as envisaged herein does not comprise an estrogen such as estetrol or a progestin such as drospirenone. The administration-free interval may be considered a hormone-free interval in the art. During the administration-free interval, withdrawal bleeding may occur which may last around 3, 4, 5, 6, or 7 days. In certain embodiments, the placebo formulation comprises an iron supplement and/or folic acid.

In certain embodiments, the estetrol is present in the E4/DRSP COC described herein at an amount of from 12 to 18 mg. In certain embodiments, the estetrol is present in the E4/DRSP COC described herein at an amount of from 14 to 16 mg. In further embodiments, the estetrol is present in the E4/DRSP COC described herein at an amount of from 14.2 to 15.5 mg. In yet further embodiments, the estetrol is estetrol monohydrate which is present in the E4/DRSP COC described herein at an amount of from about 14 mg to about 16 mg, or from about 14.5 mg to about 15.5 mg, preferably about 15 mg. In alternative further embodiments, the estetrol is anhydrous (i.e. water-free) estetrol which is present in the E4/DRSP COC described herein at an amount of from about 13.5 to about 15.5 mg, or from about 14 to about 15 mg, preferably about 14.2 mg. In certain embodiments, the drospirenone is present in the E4/DRSP COC described herein at an amount of from 2 to 4 mg. In further embodiments, the drospirenone is present in the E4/DRSP COC described herein at an amount from 2.5 and 3.5 mg. In yet further embodiments, the drospirenone is present in the E4/DRSP COC described herein at an amount from 2.75 mg to 3.25 mg. In yet further embodiments, the drospirenone is present at an amount of about 3 mg. In certain embodiments of the E4/DRSP COC described herein, a single dosage unit of the COC comprises about 3 mg drospirenone and about 15 mg of estetrol.

In certain embodiments, the pharmacokinetic profile for drospirenone after a single dose of the COC comprising about 3 mg drospirenone and about 15 mg of an estetrol is characterized by a geometric mean $AUC_{0-24}$ of less than 250 ng·h/ml, preferably less than 230 ng·h/ml, and a geometric mean $C_{max}$ of less than 45 ng/ml, preferably less than 40 ng/ml, preferably less than 35 ng/ml, and optionally by a geometric mean $AUC_{inf}$ of less than about 600 ng·h/ml or less than about 550 ng·h/ml.

In certain embodiments, the contraceptive kit as described herein is intended, for use in reducing side effects of drospirenone in a subject under use of a reference COC comprising drospirenone and another estrogen than estetrol. In certain embodiments, said reference COC comprising drospirenone is a COC comprising ethinylestradiol and drospirenone, preferably a reference COC comprising about 0.02 or about 0.03 mg ethinylestradiol and about 3 mg drospirenone.

The side effects described herein may be clinical manifestations, i.e. undesirable or pathogenic symptoms, but may also comprise a change in molecular parameters, such as a decrease or increase of a certain molecule, such as a hormone or an enzyme, or even a transmembrane channel A skilled person is aware that many changes on a molecular level may not lead to a clinical manifestation, but that they nevertheless may be indicative for a clinical event occurring at a later time point or contributing to a risk of a clinical event occurring at a later time point. It is understood that distinct changes at molecular level may result in a single clinical event, effect, or manifestation. In certain embodiments, the reduction of side effects of drospirenone in subjects using a COC comprising estetrol and drospirenone is compared to (a) subject(s) using a COC comprising drospirenone and an estrogen which is not estetrol. In further embodiments, the estrogen which is not estetrol is an equivalent amount of ethinylestradiol (EE). "Ethinylestradiol" is a molecule that is well-defined in the art, and may be characterized by the molecular formula $C_{20}H_{24}O_2$ (PubChem CID: 5991). A skilled person is aware that the observations, hypotheses, and conclusions described herein are readily applicable to COCs having as estrogenic component yet alternative estrogens, including but not limited to estradiol (E2) (molecular formula $C_{18}H_{24}O_2$, PubChem CID: 5757).

In certain embodiments, the percentage of subjects wherein a reduction in one or more drospirenone-related side effects is observed or reported is at least 20%, preferably at least 40%, at least 50%, at least 75%, at least 100%. In certain embodiments, the one or more drospirenone-related side effects are independently selected from the group consisting of: a QT interval prolongation by at least 5 milliseconds (ms), free testosterone reduction or free testosterone suppression, C-reactive protein elevation, decreased libido, headache, nausea, vomiting, bloating, cramps, breast pain, breast tenderness, breast swelling, fatigue, hair loss, increase in potassium levels etc.

In a further aspect, a COC comprising estetrol and drospirenone for reducing side effects of drospirenone associated with the continuous use of a combined oral contraceptive comprising drospirenone is envisaged. With "continuous use" is meant the application of the dosage regimen during multiple periodic cycles, such as through 2, 3, 4, 5, 6, or more periodic cycles. In certain embodiments, one periodic cycle comprises the application of 21 to 28 daily dosage units of the E4/DRSP COC as described herein, followed by 4 to 7 days wherein no COC is used by a subject and optionally a placebo product is used for compliance reasons, i.e. to provide a daily pill for each day of the period such that the subject does not have to count the COC-free days in the dosage regimen. In certain embodiments, the drospirenone side effects are provoked in a subject by use of a drospirenone comprising COC that does not comprise estetrol. In certain embodiments, the subject is a first time COC user. By "first time COC" user is meant a subject not having used a COC comprising an estrogen and progestogen earlier during the lifespan of said subject. In further embodiments, the subject is a first time COC user part of a family (i.e. a biological family wherein family members are linked by genetic heritage) wherein cardiovascular problems have been reported. In alternative further embodiments, the subject is a first time COC user part of a family wherein female sexual dysfunction has been reported.

In certain embodiments, the COC comprising estetrol and drospirenone further comprises one or more excipients. The term "excipient" as used herein may be indicative for any solvents, diluents, buffers (e.g., neutral buffered saline, phosphate buffered saline, Tris-HCl, acetate, phosphate buffers), solubilisers (e.g., Tween 80, Polysorbate 80), colloids, dispersion media, vehicles (e.g. petrolatum, dimethyl sulfoxide, mineral oil), fillers, antiadherents (e.g. magnesium stearate, talc) chelating agents (e.g., EDTA, glutathione), amino acids (e.g. glycine, (L–)glutamate, (L–) arginine, (L–)histidine), proteins, disintegrants (e.g. maize starch, sodium starch glycolate (type A)), binders (e.g. gelatin, synthetic polymers including polyvinylpyrrolidone (PVP, povidone) and polyethylene glycol, saccharides such as sucrose, lactose, (maize) starch, cellulose, hydroxypropyl cellulose, xylitol, sorbitol, mannitol), lubricants, wetting agents, stabilisers, emulsifiers, sweeteners (e.g. sugars), colorants, flavourings (both natural flavorings such as fruit extract or artificial flavorings are envisaged), aromatisers, thickeners, agents for achieving a depot effect, coatings, antifungal agents, preservatives (e.g. Thimerosal™, benzyl alcohol), antioxidants (ascorbic acid, sodium metabisulfite, butylated hydroxy anisole and/or toluene), tonicity controlling agents, absorption delaying agents, adjuvants, bulking agents (e.g., lactose, mannitol) and the like. "Excipient" may be indicated in the art by synonyms including but not limited to "carriers". It is furthermore evident to a skilled person that certain excipients may fulfill multiple functions. Alternatively, certain excipients may be used during the manufacturing process of the COC but are no longer detectable in the end product, such as (purified) water.

A typical (single) tablet composition representative for the composition envisaged herein may comprise estetrol monohydrate, drospirenone, lactose monohydrate, sodium starch glycolate type 1, maize or corn starch, povidone K30, and magnesium stearate, optionally coated with AquaPolish Pink 044.08 MS. For coating, first a suspension may be prepared, which is subsequently applied on the tablet by any suitable coating process. Coating processes have been discussed in detail in the art and are therefore known to a skilled person (e.g. Ankit et al., Tablet Coating techniques: Concepts and recent trends, IRJP, 2012). More specifically, a typical (single) tablet composition may comprise estetrol monohydrate from about 10 mg to 20 mg, preferably from about 12 mg to 18 mg, more preferably 14 mg to 16 mg; drospirenone from about 1 mg to 5 mg, preferably from about 2 mg to 4 mg; lactose monohydrate from about 25 to 50 mg, preferably from about 30 to 45 mg; sodium starch glycolate type A from about 1 mg to 10 mg, preferably from about 2 to 8 mg; maize or corn starch from about 5 mg to 20 mg, preferably from about 10 mg to 20 mg; povidone K30 from about 0.5 mg to 5 mg; and magnesium stearate from about 0.1 mg to about 5 mg; preferably from about 0.2 mg to about 3 mg. The optional coating suspension, when dried, may add from about 1 mg to 10 mg, preferably from about 1 mg to 5 mg to the tablet weight. In certain embodiments, the formulation may comprise pharmaceutically acceptable auxiliary substances as required to approximate physiological conditions, such as pH adjusting and buffering agents, preservatives, complexing agents, tonicity adjusting agents, wetting agents and the like, non-limiting examples include sodium acetate, sodium lactate, sodium phosphate, sodium hydroxide, hydrogen 20 chloride, benzyl alcohol, parabens, EDTA, sodium oleate, sodium chloride, potassium chloride, calcium chloride, sorbitan monolaurate, and triethanolamine oleate. The use of such media and agents for formulating pharmaceutical compositions is well known in the art (see for example Kalasz and Antal, Drug excipients, Curr Med Chem, 2006). Furthermore, methodologies and information on the formulation and administration of pharmaceutical compositions have been disclosed in the art (e.g. reference book: Remington: The Science and Practice of Pharmacy, periodically revised).

Also envisaged herein is a method for reducing the risk of (or alleviating) adverse (side) effects of drospirenone in a subject under a continuous regimen of a COC comprising drospirenone, comprising the step of providing a subject with a COC comprising drospirenone as the progestogenic component and estetrol as the estrogenic component. In certain embodiments, the subject is diagnosed with, or suspected of having adverse effects due to using a COC comprising drospirenone. In certain embodiments, the subject has experienced adverse effects due to a previous use of drospirenone-comprising COCs. In certain embodiments, the adverse effects are selected from the group consisting of: a reduction in free testosterone blood serum concentration by at least 0.25 ng/dL or of more than 50%, preferably more than 60% or more than 70% with respect to the baseline concentration, a QT interval prolongation of at least 5 ms, an increase in C-reactive protein blood serum concentration resulting in a value that is equal to or above 1.5 such as equal to or above 2 mg/L blood serum. In certain embodiments, the COC is provided to the subject by daily oral administration, preferably by daily oral administration during a period of at least 21, or up to 28 days. In certain embodiments, the subject is a first time COC user. In alternative embodiments, the subject is a subject that has previously used a COC comprising drospirenone, a subject that has changed type of COC or a subject that interrupted the use of COC for more than 4 weeks.

Without limitation, "predicting" or "prediction" generally refer to a statement, declaration, indication or forecasting of a disease or condition in a subject not (yet) showing any, or a limited, clinical manifestation of said disease, condition, or (adverse) side effects. A prediction of a disease, condition, or adverse effect in a subject may indicate a probability, chance, or risk that said subject will develop said disease, condition, or (adverse) side effect, for example within a certain time period, a certain age, a certain timeframe of taking a certain medication, or in the context of the current invention a contraceptive. Said probability, chance or risk may be indicated as any suitable qualitative or quantitative expression, wherein non-limiting examples of a quantitative expression include absolute values, ranges or statistics. Alternatively, probabilities, chances, or risks may be indicated relative to a suitable control subject or group of control subject (i.e. a control subject population (such as, e.g., relative to a general, normal or healthy subject or subject population)). Therefore, any probability, chance or risk that a subject will develop a disease, condition, or (adverse) side effect may be advantageously indicated as increased or decreased, upregulated or downregulated, as fold-increased or fold-decreased relative to a suitable control subject or subject population, or relative to a baseline value which may be derived from either a control subject (population), textbook reference values. It is evident that when a population of subjects is used to define the baseline value, said baseline value will be a center size of one or more values (parameters) of a population, such as the mean or median of said value. The term "prediction" of the conditions, diseases, or (adverse) side effects as described herein may also particularly mean that the subject has a 'positive' prediction of such, i.e. that the subject is at risk of having such (e.g., the risk is significantly increased vis-à-vis a control subject or control or general subject population).

"Diagnosed with", "diagnosing", and diagnosis are indicative for a process of recognizing, deciding on, or concluding on a disease, condition, or (adverse side effect) in a subject on the basis of symptoms and signs and/or from results of various diagnostic procedures (such as, for example, from knowing the presence, absence and/or quantity of one or more biomarkers of or clinical symptoms characteristic for the diagnosed disease or condition). "Diagnosis of" the diseases, conditions, or (adverse) side effects as taught herein in a subject may particularly mean that the subject has such disease or condition. A subject may be diagnosed as not having such despite displaying one or more conventional symptoms or signs reminiscent of such.

A skilled person appreciates that monitoring of a disease, condition, or (adverse) side effect may allow to predict the occurrence of said disease, condition, or (adverse) side effect or to monitor the progression, aggravation, alleviation or recurrence of the disease, condition, or (adverse) side effect or response to treatment or to other external or internal factors, situations or stressors, etc. Furthermore, monitoring may be applied in the course of a medical treatment of a subject. Such monitoring may be comprised, e.g., in decision making whether a patient may be discharged from a controlled clinical or health practice environment, needs a change in treatment or therapy, or requires (further) hospitalization.

In certain embodiments, the contraceptive kit as described herein is intended, for use in reducing the decrease in blood serum free testosterone concentration associated with the use of a COC comprising drospirenone in a subject. In further embodiments, the contraceptive kit and COC are used for at least 6 cycles. "Free testosterone concentration decrease" as used in this context refers to a decrease of free testosterone blood serum concentration levels, or a median reduction of free testosterone blood serum concentration levels when multiple subjects are considered. In further embodiments, said free testosterone blood serum concentration decrease is reduced by 10% in said subject using the E4/DRSP COC as described herein when compared to a subject using a COC comprising ethinylestradiol as estrogenic component and an equivalent effective amount of drospirenone. In further embodiments, said free testosterone blood serum concentration decrease is reduced by 12%, preferably by 14%, preferably by 15%, preferably by 16%, preferably by 18%, preferably by 20%, in said subject using the E4/DRSP COC as described herein for at least 6 cycles when compared to a subject using a COC comprising ethinylestradiol as estrogenic component and an equivalent effective amount of drospirenone for an identical amount of cycles.

In certain embodiments, the free testosterone blood serum concentration of subjects using a COC for at least 6 cycles comprising ethinylestradiol as estrogenic component and an equivalent effective amount of drospirenone is between about 0.09 ng/dL and 0.20 ng/dL for subjects having a free testosterone blood serum concentration of between 0.20 ng/dL and 0.80 ng/dL prior to using said COC. In certain embodiments, the free testosterone blood serum concentration reduction of a subject using a E4/DRSP COC as described herein for at least 6 cycles is between about 0.09 ng/dL and 0.60 ng/dL for subjects having a free testosterone concentration of between 0.100 ng/dL and 1.0 ng/dL prior to using said COC. In certain embodiments, the median free testosterone blood serum concentration in subjects using for at least 6 cycles COCs having a estrogenic component ethinylestradiol is about 0.086 ng/dL, and the median free testosterone blood serum concentration in subjects using for at least 6 cycles COCs as described herein is about 0.20 ng/dL.

In certain embodiments, the free testosterone concentration is at least 25%, preferably at least 30%, preferably at least 35%, preferably at least 40%, more preferably at least 50% of a baseline value, wherein said baseline value is the free testosterone blood serum expression level in said subject before using a COC comprising drospirenone. In certain embodiments, the free testosterone blood serum concentration reduction of a subject using a COC comprising ethinylestradiol as estrogenic component and an equivalent effective amount of drospirenone for at least 6 cycles is between 89% and 50% of a baseline value. In further embodiments where multiple subjects are considered, the free testosterone concentration blood serum reduction of a COC comprising ethinylestradiol as estrogenic component and an equivalent effective amount of drospirenone has a median value of 71% of a baseline value. In certain embodiments, the free testosterone blood serum concentration reduction of a subject using the E4/DRSP COC as described herein for at least 6 cycles is between 80% and 0% of a baseline value. In further embodiments where multiple subjects are considered, the free testosterone blood serum concentration reduction of the E4/DRSP COC as described herein has a median value of 50% of a baseline value. In certain embodiments, the baseline value is the median free testosterone concentration prior to using any COC, and it is evident to a skilled person the baseline value will be variable due to inter-subject variability. By means of guidance and not limitation, suitable testosterone blood serum concentration baseline values may be any value from about 0.10 ng/dL to about 1.20 ng/dL, such as about 0.10 ng/dL, about 0.20 ng/dL, about 0.35 ng/dL, 0.50 ng/dL, 0.80 ng/dL, 1.00 ng/dL. In certain embodiments, the free testosterone blood serum concentration is at least 0.09 ng/dL, preferably at least 0.20 ng/dL in said subject when using the E4/DRSP COC as described herein. In certain embodiments, the free testosterone blood serum concentration is at least 0.09 ng/dL, preferably at least 0.20 ng/dL in said subject when using the E4/DRSP COC as described herein for at least 6 cycles.

"Free testosterone", or "free T" as used herein refers to testosterone not bound to proteins including albumin and sex hormone binding globulin (SHBG). Free testosterone is transported into the cytoplasm of target tissue cells, where it can bind to the androgen receptor, or can be reduced to 5α-dihydrotestosterone (DHT) by the cytoplasmic enzyme 5α-reductase (Goldman et al., A Reappraisal of Testosterone's Binding in Circulation: Physiological and Clinical Implications, Endocrine Reviews, 2017). It has been disclosed in the art that COCs reduce levels of androgens, in particular testosterone (free testosterone and total testosterone). It has been formulated that in female subjects about between 65% to 70% of circulating testosterone is bound and inactivated by SHBG, about between 30% to 35% is bound to albumin, and therefore free testosterone is present in about between 0.5% to 3%. Numerous methods suitable for measuring free testosterone in (sample of) a subject have been described in the art and include but are not limited to liquid chromatography-tandem mass spectrometry (LC-MS/MS), equilibrium dialysis, immunoassays. Alternatively, the levels of free testosterone in (samples of) female subjects may be derived from total testosterone, SHBG, and albumin concentrations.

The term "baseline value" used herein is to be interpreted as the commonly accepted meaning in the art. A baseline value in the field of medicine represents a value prior to the start of an experiment or study in (a sample of) a subject, or may even be a reference value known in the art for a population of subject. The use of baseline values allows a skilled person to express changes over time due to one or more interventions that impact the parameter for which a baseline value has been established (Chiolero et al., Assessing the Relationship between the Baseline Value of a Continuous Variable and Subsequent Change Over Time, Front Public Health, 2013). In the context of this specification, the intervention is the administration of a COC, unless stated otherwise.

In certain embodiments, the contraceptive kit as described herein is envisaged, for use in reducing the risk of a prolonged QT interval associated with the use of a COC comprising drospirenone in a subject, preferably by reducing the risk of prolongation of the mean and/or median QT interval by more than 5 ms. In further embodiments, the contraceptive kit and COC are used for at least 6 cycles. The "risk of a prolonged QT interval" in the context of this disclosure is considered to be the chance that by using a COC, a prolongation of (mean or median) QT interval is observed in a subject. In certain embodiments, the risk for said subject to experience QT interval prolongation is reduced by 10%, preferably by 25%, preferably by 30%, preferably by 40%, preferably by 50%, preferably by 60%, preferably by 75%, preferably by 90%, more preferably by 100%, in said subject using the E4/DRSP COC described herein when compared to a subject using a COC comprising ethinylestradiol as estrogenic component and an equivalent effective amount of drospirenone. In certain embodiments, the mean QT interval of a subject using a COC comprising ethinylestradiol as estrogenic component and an equivalent effective amount of drospirenone for at least 6 cycles is prolonged by a mean and/or median interval of between 5 ms and 15 ms, preferably between 5 ms and 10 ms, while the QT interval of a subject using the E4/DRSP COC as described herein for at least 6 cycles is prolonged by a mean and/or median interval of between 0 ms and 5 ms. In certain embodiments, a QT interval is considered prolonged when the (mean and/or median) time between the start of the Q wave and the end of the T wave in an electrocardiogram of a subject is prolonged by at least 5 milliseconds when compared to the QT interval of said subject prior to using a COC comprising drospirenone. In further embodiments, the QT interval is considered prolonged when the time between the start of the Q wave and the end of the T wave in an electrocardiogram of a subject is prolonged by at least 6, preferably at least 7, preferably at least 8 milliseconds when compared to the QT interval of said subject prior to using a COC.

In certain embodiments the difference between the lengthening from a baseline QT interval to a mean QT interval after using the E4/DRSP COC as described herein for at least 6 cycles is between 4 and 10 units shorter, preferably between 5 and 10 units shorter, preferably between 5.5 and 10 units shorter than the difference between the lengthening from a baseline QT interval to a mean QT interval after using a COC comprising ethinylestradiol as estrogenic component and an equivalent effective amount of drospirenone for at least 6 cycles. In certain embodiments the difference between the lengthening from a baseline QT interval to a median QT interval after using the E4/DRSP COC as described herein for at least 6 cycles is between 8 and 15 units shorter, preferably between 8 and 12 units shorter, preferably between 7 and 10 units shorter than the difference between the lengthening from a baseline QT interval to a mean QT interval after using a COC comprising ethinylestradiol as estrogenic component and an equivalent effective amount of drospirenone for at least 6 cycles.

"QT interval" as used herein refers to a parameter that may be derived from a electrocardiogram and describes the time from the start of the Q wave to the end of the T wave. The QT interval indicates (approximately) the time it takes for a heart of a subject to transition from the start of contraction of the cardiac ventricles to the end of the relaxation period of said cardiac ventricles. Alternatively phrase is the QT interval equal to the time taken from when the cardiac ventricles start to contract to when they finish relaxing. The length of a QT interval can be manually measured in an electrocardiogram complex by different methods, including the tangent method and the threshold method. In the tangent method, the end of the T wave is determined by defining the intersecting (i.e. the merging) point of the T wave with the isoelectric baseline of the electrocardiogram. In the threshold method, the end of the T wave is determined by the intersection of a tangent line extrapolated from the T wave at the point of maximum downslope to the isoelectric baseline (Panicker et al., Intra- and interreader variability in QT interval measurement by tangent and threshold methods in a central electrocardiogram laboratory, J Electrocardiol, 2009).

Since the length of the QT interval is inversely correlated with the hearth rate (i.e. a faster hearth rates will be reflected by a shorter QT interval), the QT interval may be corrected for differences in heart rate using different correction formula's such as but not limited to the Bazett formula, the Friderica formula, the Sagie formula, and the Framingham formula. In general, longer QT intervals correspond to increasing chances of a subject to experience sudden cardiac death (Algra et al., QTc prolongation measured by standard 12-lead electrocardiography is an independent risk factor for sudden death due to cardiac arrest, Circulation, 1991). In certain embodiments, the mean Friderica's QT interval (hereafter indicated by QTcF interval) of a subject using a COC comprising ethinylestradiol as estrogenic component and an equivalent effective amount of drospirenone for at least 6 cycles is prolonged by a mean and/or median interval of between 3 ms and 10 ms, preferably between 3 ms and 8 ms, preferably between by about 4 ms, while the QTcF interval of a subject using the E4/DRSP COC as described herein for at least 6 cycles is prolonged by a mean and/or median interval of between 0 ms and 3 ms, preferably between 0 ms and 2.5 ms. In certain embodiments the difference between the lengthening from a baseline QTcF interval to a mean QTcF interval after using the E4/DRSP COC as described herein for at least 6 cycles is between 2 and 5 units shorter, preferably between 2.5 and 4 units shorter, preferably about 2.8 units shorter than the difference between the lengthening from a baseline QTcF interval to a mean QTcF interval after using a COC comprising ethinylestradiol as estrogenic component and an equivalent effective amount of drospirenone for at least 6 cycles. In certain embodiments the difference between the lengthening from a baseline QTcF interval to a median QTcF interval after using the E4/DRSP COC as described herein for at least 6 cycles is between 1 and 4 units shorter, preferably between 1 and 3 units shorter, preferably between 1.5 and 2.5 units shorter than the difference between the lengthening from a baseline QTcF interval to a median QTcF interval after using a COC comprising ethinylestradiol as estrogenic and an equivalent effective amount of drospirenone for at least 6 cycles.

In certain embodiments the mean and/or median QT interval prolongation in a subject using the E4/DRSP COC as described herein is 20% shorter, preferably 25% shorter, preferably 30% shorter, preferably 35% shorter, preferably 40% shorter, more preferably 45% shorter, most preferably 50% shorter than the respective mean and/or median QT interval prolongation in a subject using a COC comprising an equivalent effective amount of drospirenone as progestogenic component and ethinylestradiol as estrogenic component. In certain embodiments, the median and/or median QtcF interval prolongation in a subject using the E4/DRSP COC as described herein is 20% shorter, preferably 25% shorter, preferably 30% shorter, preferably 35% shorter, preferably 40% shorter, more preferably 45% shorter, most preferably 50% shorter than the respective mean and/or median QTcF interval prolongation in a subject using a COC comprising an equivalent effective amount of drospirenone as progestogenic component and ethinylestradiol as estrogenic component.

In certain embodiments, the estetrol inhibits QT interval prolongation in a subject using the E4/DRSP COC as described herein by counteracting drospirenone-induced QT interval lengthening. While a skilled person is aware that progestogens in general reduce the length of the QT interval in a subject, drospirenone in particular exerts an opposite influence on the length of the QT interval (i.e. drospirenone induces a QT interval prolongation, as discussed inter alia in Salem et al., Association of Oral Contraceptives With Drug-Induced QT Interval Prolongation in Healthy Nonmenopausal Women, JAMA Cardiology, 2018). In certain embodiments, the estetrol inhibits QT interval prolongation in a subject by nullifying drospirenone-induced QT interval lengthening. In further embodiments wherein the drospirenone-induced QT prolonging effects are nullified by the estetrol in the E4/DRSP COC as described herein, the estrogenicity of estetrol is the only contributing factor to the resulting QT prolongation in subjects using said COC. In alternative embodiments wherein the drospirenone-induced QT prolonging effects are nullified by the estetrol in the E4/DRSP COC as described herein, the anti-androgenicity of estetrol is the only contributing factor to the resulting QT prolongation in subjects using said COC. "anti-androgenicity" is indicative for the capacity of a molecule to prevent androgens such as testosterone, dihydrotestosterone, and the likes from achieving a biological effect in a subject. Anti-androgens can either function through inhibiting binding to the androgen receptor, and/or suppressing production of one or more androgens as such. Anti-androgens are commonly considered functional opposites of androgen receptor agonists. In general anti-androgenicity may be related to estrogenicity.

In certain embodiments, the E4/DRSP COC as described herein has reduced estrogenic-related effects on the QT interval when compared to a subject using a COC comprising an equivalent effective amount of drospirenone as progestogenic component and ethinylestradiol as estrogenic component. It is disclosed in the art that estrogens in general are causative for QT prolongation in subjects using COCs (Salem et al., Influence of steroid hormones on ventricular polarization, Pharmacology & Therapeutics, 2016). In further embodiments, the estrogenic related effect is a prolongation of the QT interval, preferably prolongation of the QT interval by estrogenic-mediated suppression of $I_{Kr}$ and/or $I_{Ks}$ channel currents. A skilled person understands that cardiac repolarization is controlled by rapidly ($I_{Kr}$) and slowly ($I_{Ks}$) activating delayed rectifier potassium channels, and that decreases in any of these channels may cause QT prolongation and optionally development of long QT syndrome, which is a cardiac disorder characterized by a high risk for sudden cardiac arrest (Chiamvimonvat et al., Potassium currents in the heart: functional roles in repolarization, arrhythmia and therapeutics, J Physiol, 2017). In certain embodiments, the estrogenic-mediated suppression of $I_{Kr}$ and/or $I_{Ks}$ channel currents is 25% less, preferably 50% less, preferably 75% less than the estrogenic-mediated suppression of an estrogen selected from the group consisting of: ethinylestradiol, estradiol, and estrogen. In further embodiments, the estrogen to which the effect of estetrol is compared with is ethinylestradiol. In further embodiments, the estrogenic related effect is a prolongation of the QT interval, preferably prolongation of the QT interval by estrogenic-mediated suppression of $I_{Kr}$, $I_{Ks}$ and inward rectifier channel OKI channel) currents. The role of the $I_{K1}$ channels in shaping the QT interval is disclosed in the art (Dhamoon and Jalife, The inward rectifier current ($I_{K1}$) controls cardiac excitability and is involved in arrhythmogenesis, Heart Rhythm, 2005).

In certain embodiments, the contraceptive kit as described herein is intended for use to reduce the increase of or to prevent elevated C-reactive protein blood serum concentration levels associated with the use of a COC comprising drospirenone and ethinylestradiol in a subject. As intended herein, the C-reactive protein blood serum concentration level is considered elevated when said level is 10% higher, preferably 15% higher, preferably 20% higher, preferably 25% higher, preferably 30% higher than a baseline value, wherein said baseline value is the C-reactive protein blood serum concentration level in said subject before using a COC. A skilled person appreciates that baseline values C-reactive protein concentration levels are attributed to individual subjects, or are based on one or more textbook reference value. By means of guidance and not limitation, a suitable baseline value for CRP is 0.100 mg/dL (1.00 mg/L). In certain embodiments, a median increase of 0% in C-reactive protein blood serum concentration in view of the baseline value is observed in subjects using the E4/DRSP COC as described herein for at least 6 cycles, while a median increase of 30% in C-reactive protein blood serum concentration is observed in subjects using a COC comprising ethinylestradiol as estrogenic component and an equivalent effective amount of drospirenone for at least 6 cycles. In certain embodiments, the C-reactive protein blood serum concentration of a subject using the E4/DRSP COC as described herein for at least 6 cycles increases with less than 1.5 fold the baseline value, and the C-reactive protein blood serum concentration of a subject using a COC comprising ethinylestradiol as estrogenic component and an equivalent effective amount of drospirenone for at least 6 cycles. In certain embodiments, the C-reactive protein blood serum concentration level is less than 1.75 mg/L in said subject when using the E4/DRSP COC as described herein. In certain embodiments, the C-reactive protein blood serum concentration level is less than 2.00 mg/L in a subject using the E4/DRSP COC described herein for at least 6 cycles. In further embodiments, the C-reactive protein blood serum concentration is less than 1.75 mg/L, preferably less than 1.5 mg/L in said subject when using the E4/DRSP COC as described herein, preferably for at least 6 cycles. Using the COC of the invention reduces the risk of increase in CRP levels associated with prolonged and continuous use of a COC comprising DRSP and another estrogen than E4. Typically, the CRP levels in healthy subjects not going through a period of inflammation is below 2 mg/L blood serum and the continuous use of the COC of the invention does not result in a substantial increase of CRP levels above this threshold in said healthy subject not going through a period of inflammation.

C-reactive protein has been described in detail in the art and is a pentameric protein present in blood serum. C-reactive protein circulating concentrations are known to increase, i.e. elevate in response to inflammation. Increased C-reactive protein levels have been associated with atherosclerotic cardiovascular disease (ASCVD). However, no conclusion has been reached as to whether C-reactive protein is a nonspecific marker indicating an acute phase response to inflammatory stimuli, or whether C-reactive protein is a direct participant in the clinical image of ASCVD. As commonly accepted in the art (cf. 2019 ACC/AHA Guideline on the Primary Prevention of Cardiovascular Disease: A Report of the American College of Cardiology/American Heart Association Task Force on Clinical Practice Guidelines) C-reactive protein blood serum concentration levels in view of cardiac risk stratification can be categorized in different categories: low risk category (<2 mg/L), moderate to high risk (≥2 mg/L). Hence, in preferred embodiments, the C-reactive protein blood serum concentrations observed in subjects using the E4/DRSP COC as described herein correspond to the low risk category concentration levels. Routine assays for measuring C-reactive protein levels in (a sample of) a subjects are available, and include but are not limited to immunoassay methods such as enzyme-linked immunosorbent assays (ELISAs) and turbidimetry. Evidently, the changes in C-reactive protein concentration as disclosed herein are minor after a single dosage, or even a limited amount of daily doses. Nevertheless, over a prolonged period of time, the increase in C-reactive protein when using a E4/DRSP COC will be markedly lower than the increase in C-reactive protein when using an COC comprising ethinylestradiol and drospirenone, to which a comparison is made throughout this specification. Hence, the reduction of C-reactive protein increase in a subject using a E4/DRSP COC is more pronounced with increasing daily dosage units that have been administered to said subject. The long-term effect hereof is that subject using the E4/DRSP COC as described herein are classified in a lower cardiovascular risk group. For example, a subject initially showing a low risk profile (<2 mg/L) will have a higher change of remaining in the same risk group upon (prolonged) use of an E4/DRSP COC as described herein, when compared to the same subject using an EE/DRSP COC. In the EE/DRSP regimen, the subject is more likely to experience an increase in C-reactive protein concentration leading to a change in risk category from low to medium or high risk (≥2 mg/L).

Also intended is a composition comprising estetrol for use in reducing the bioavailability of drospirenone in a subject under use of a COC comprising drospirenone. In certain embodiments, the composition comprising estetrol is comprised in the same contraceptive kit as the COC, optionally within the same packaging unit. In certain embodiments, the estetrol comprising composition is provided as a separate active dosage unit to the subject using a COC comprising drospirenone and an estrogen which is not estetrol. In certain embodiments, the bioavailability of drospirenone is reduced by the presence of estetrol by at least 5%, preferably at least 10%, preferably at least 15%, preferably at least 25%, preferably at least 50%. In further embodiments, said estetrol functions as the estrogenic component of said combined oral contraceptive and drospirenone functioning as the progestogenic component. In alternative further embodiments, said estetrol functions as main estrogenic component of said combined oral contraceptive and drospirenone functioning as the main progestogenic component. Accordingly, the specification as described herein does not exclude embodiments that combine estetrol in an amount disclosed herein with a distinct estrogen in the E4/DRSP COC described herein, and/or does not exclude embodiments that combine drospirenone in an amount disclosed herein with a distinct progestogen or progestin in the E4/DRSP COC described herein.

"Bioavailability" as used herein and having generally accepted abbreviations "BA" and "F" is to be interpreted having its commonly accepted meaning in the art and hence refers to an expression, preferably a quantitative expression, of the rate and extent to which a drug may achieved systemic circulation and thus exerts its envisaged function. Alternatively phrased, bioavailability is a subcategory of absorption and is the fraction, typically expressed in percentages (%), of an administered drug that reaches systemic circulation. It is commonly accepted that when intravenously administered, the bioavailability is considered to be 100%, and when other means of administration are used typically a lower bioavailability is obtained, mainly due to the first-pass effect or first pass metabolism and absorption metabolism of a subject (Herman and Santos, First pass effect, StatPearls, 2019). Bioavailability is typically calculated or derived from the Area Under the (plasma drug concentration) Curve (AUC) by comparison of the extravascular formulation to the intravascular formulation. The AUC is a preferred means for arriving at the bioavailability of a drug, or in the context of the current invention contraceptive, since the AUC is proportional to the dose present in systemic circulation.

In certain embodiments, the estetrol composition as described herein is intended for use in reducing side effects of drospirenone in a subject under use of a combined oral contraceptive comprising drospirenone. In further embodiments, the estetrol composition is administered to said subject in oral administration. In certain embodiments, the estetrol composition is administered simultaneous with a combined oral contraceptive comprising drospirenone. In alternative embodiments, the estetrol composition as described herein is intended for use in reducing side effects of drospirenone in a subject under use of an oral contraceptive comprising a progestin, such as but not included to drospirenone, and lacking an estrogen component. In certain embodiments, the progestin oral contraceptive (i.e. a "progestin only pill, commonly abbreviated in the art as "POP"). In certain embodiments, the estetrol composition is envisaged for use to reduce the risk of elevated C-reactive protein (CRP) blood serum concentration levels associated with the use of a combined oral contraceptive comprising drospirenone. In further embodiments, no elevated C-reactive protein blood serum concentration is observed in a subject using an E4/DRSP COC.

A further aspect of the invention is directed to estetrol for use in lowering the steady state bioavailability of drospirenone in a COC with at least 15% as compared to COCs comprising ethinylestradiol or estradiol. Hence, it is intended that an E4/DRSP COC as described herein achieves a lower relative steady state bioavailability of DRSP when compared to a subject using a COC having as progestogenic component drospirenone and as estrogenic component an estrogen that is not estetrol. In certain embodiments, the steady state bioavailability of drospirenone is reduced by at least 20%, preferably at least 25%, at least 30%, at least 35%, at least 40%, at least 45%, at least 50%. In certain embodiments, the bioavailability drospirenone when using of the COC comprising estetrol and drospirenone is compared to the steady state bioavailability of a COC comprising an equivalent amount of drospirenone, and comprising an amount from about 0.015 mg to about 0.05 mg of ethinylestradiol, preferably from about 0.02 mg to about 0.03 mg, more preferably wherein the amount of ethinylestradiol is about 0.02 mg, about 0.025 mg, or about 0.03 mg. In yet further embodiments, the equivalent amount of drospirenone is 3 mg. In certain embodiments, the drospirenone steady state bioavailability is the total bioavailability.

Another aspect of the invention is directed to estetrol for use in lowering the peak blood plasma concentration of drospirenone in subjects using COCs comprising drospirenone. In certain embodiments, the COCs comprising drospirenone comprise drospirenone in an amount of about 3 mg. In certain embodiments, the COCs comprising drospirenone comprise an estrogenic component that is not estetrol. In further embodiments, the estrogenic component is ethinylestradiol or estradiol. In certain embodiments, the peak blood plasma concentration of drospirenone in subjects using COCs comprising about 3 mg drospirenone is reduced by at least 5%, preferably at least 10%, at least 15%, at least 20%, at least 25%, at least 30%, at least 35%, at least 40%, at least 45%, at least 50% when compared to said subject wherein estetrol is not used for lowering the bioavailability. In certain embodiments, the peak blood plasma concentration of drospirenone in subjects using COCs comprising about 3 mg drospirenone is reduced by at least 5%, preferably at least 10%, at least 15%, at least 20%, at least 25%, at least 30%, at least 35%, at least 40%, at least 45%, at least 50% when compared to said subject wherein estetrol is not used for lowering the bioavailability.

A further aspect of the invention relates to the use of estetrol for the manufacture of a composition (i.e. medicament or contraceptive) for the prevention or treatment of adverse effect attributable to the use of drospirenone in a COC. In further embodiment, the use of estetrol for the manufacture of a composition (i.e. medicament or contraceptive) for the prevention or treatment of QT interval prolongation in subjects using a drospirenone comprising COC is intended. In alternative further embodiments, the use of estetrol for the manufacture of a composition (i.e. medicament or contraceptive) for the prevention or treatment of free testosterone blood serum level reduction in subjects using a drospirenone comprising COC is intended. In yet alternative further embodiments, the use of estetrol for the manufacture of a composition (i.e. medicament or contraceptive) for the prevention or treatment of a C-reactive protein level increase in subjects using a drospirenone comprising COC is envisaged.

The terms "treatment" or "treat" are to be interpreted as both the therapeutic treatment of a disease or condition that has already developed, leading to clinical manifestations, such as the therapy of an already developed prolonged QT syndrome, sexual dysfunction (e.g. less sexual desire), as well as prophylactic or preventive measures, wherein the goal of the treatment is to prevent, lessen, or reduce the chances of incidence of an undesired affliction, such as to prevent occurrence, development and progression of a clinical condition or disease. Beneficial or desired clinical results may include, without limitation, alleviation of one or more symptoms, improvement of one or more biological markers, diminishment of extent of disease, stabilized (i.e. not worsening) state of disease, delay or slowing of disease progression, amelioration or palliation of the disease state, and the like. "Treatment" can also mean prolonging survival as compared to expected survival if not receiving treatment, or a reduced risk of mortality.

As used herein, the terms "therapeutic treatment" or "therapy" and the like, refer to treatments wherein the aim is to change a subjects body or a part of a subjects body from an undesired physiological state, disease or disorder, such as one or more adverse side effects induced by using COCs comprising drospirenone, to a desired state, such as a less severe state (e.g., amelioration or palliation), or even back to its normal, healthy state (e.g., restoring the health, the physical integrity and the physical well-being of a subject), to keep it (i.e., not worsening) at said undesired physiological status (e.g., stabilization), or slow down progression to a more severe or worse state compared to said undesired physiological change or disorder. Measurable lessening includes any statistically significant decline in a measurable marker or symptom. Statistically significant as used herein refers to p values below 0.05, which is a commonly accepted cutoff score in statistical analysis as a skilled person appreciates. "treatment" encompasses both curative treatments and treatments directed to reduce symptoms and/or slow progression and/or stabilize the disease. A skilled person is aware that in order to achieve an effective therapeutic treatment, a therapeutically effective dose needs to be administered to said subject.

"Prevention" or "prevent" as used in the context of the invention refers to an aversion of manifestation of a disease image in a subject, i.e. the establishment of preventive measures or prophylactic measures. Preventive treatment refers to treatments wherein the object is to avoid a subject's body or an element thereof to show clinical symptoms of an undesired physiological change or disorder. A skilled person is aware that in order to achieve an effective therapeutic treatment, a prophylactically effective dose needs to be administered to said subject. In the context of the invention, the E4/DRSP COC may be administered to a subject to prevent manifestation of a medical condition, disease, or (adverse) side effects that will, or are likely to, occur in a subject when said subject would use a COC comprising drospirenone as progestogenic component and an estrogen different from estetrol.

The term "therapeutically effective dose" or "therapeutically effective amount" as used herein refers to an amount of a therapeutic protein or therapeutic peptide as taught herein, that when administered brings about a positive therapeutic response with respect to treatment of a subject suffering from a disease, e.g. a patient having been selected (e.g. diagnosed) to have or a certain disease. The term "prophylactically effective dose" or "prophylactically effective amount" refers to an amount of a gene product that inhibits or delays in a subject the onset of a disorder as being sought by a researcher, veterinarian, medical doctor or other clinician.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as follows in the spirit and broad scope of the appended claims. The herein disclosed aspects and embodiments of the invention are further supported by the following non-limiting examples.

EXAMPLES

Example 1. Comparison of Pharmacokinetic Profiles Between Oral Contraceptives Comprising DRSP (3 mg), EE/DRSP (0.02 mg/3 mg), E4/DRSP (15 mg/3 mg), and DRSP (4 mg)

Clinical studies were performed to assess the different pharmacokinetic profiles after multiple dose study of the different COCs. Pharmacokinetic parameters after a single (Table 1) or repeated (Table 2) oral administration of DRSP alone or different COCs are depicted below. From the single dose administration results it can be deducted that the E4/DRSP combination showed lower DRSP AUC values when compared to ethinylestradiol comprising COCs (EE/DRSP COCs) ($AUC_{0-24}$: 224 vs 268-288 ng·h/mL; $AUC_{inf}$: 358-444 vs 458 ng·h/ml) while achieving similar $C_{max}$ values. Even more pronounced differences are found between E4/DRSP and EE/DRSP for the multiple dose administration scheme ($AUC_{0-24}$: 442-519 vs 763-827 ng·h/ml). The AUC values are sufficient to achieve a contraceptive effect, but the relative lower AUC when compared to EE/DRSP COCs may contribute to an improvement in terms of observed (adverse) side effects (further discussed in Examples 2 and 3).

TABLE 1

Pharmacokinetic parameters of DRSP after single oral administration alone or in combination with estrogens (EE and E4).

Table 1: Single Dose comparative study between EE/DRSP and E4/DRSP COC's

| Param. | DRSP 4 mg (Slynd ™) US Product Information | EE 0.03 mg DRSP 3 mg (Yasmin ™) US Product Information | EE 0.02 mg DRSP 3 mg (Yaz ™) US Product Information | DRSP 3 mg Blode H et al. Study 1* Caucasian (n = 6) | EE 0.02 mg DRSP 3 mg (Yaz ™) Blode H et al. Study 1* Caucasian (n = 18) | Blode H et al. Study 3* Caucasian (n = 23) | E4 15 mg DRSP 3 mg Study MIT-Es0001-C103** Caucasian (n = 10) | E4 15 mg DRSP 3 mg Study MIT-Es0001-C101** Caucasian (n = 24) | E4 15 mg DRSP 3 mg Study MIT-Es0001-C109** Caucasian (n = 10) | E4 15 mg DRSP 3 mg Study MIT-Es0001-C110** Caucasian (n = 21) |
|---|---|---|---|---|---|---|---|---|---|---|
| $C_{max}$ (ng/mL) | 27 | 36.9 (13) | 38.4 (25)[1] | 33.9 (20)[1] | 30.9 (27)[1] | 38.4 (26)[1] | 32.4 (30.9)[1] | 27.7 (34.4)[1] | 24.4 (23.6)[1] | 29.3 (33.5) |
| $AUC_{inf}$ (ng · h/mL) | NA | NA | NA | 506 (22)[1] | 458 (18)[1] | ND | ND | 366.2 (33) | 358.5 (34.8) | 444 (30.6) |
| $AUC_{0-24}$ (ng · h/mL) | NA | 288 (25) | 268 (19)[1] | ND | ND | 268 (19)[1] | 224 (31.9)[1] | ND | ND | ND |
| Method | | | Validated radio-immuno-assay | validated radio-immuno-assay | validated radio-immuno-assay | validated radio-immuno-assay | Validated HPLC and LC MS/MS | Validated HPLC and LC MS/MS | Validated HPLC and LC MS/MS | Validated HPLC and LC MS/MS |

AUC: area under the plasma concentration-versus-time curve,
$AUC_{0-24}$: AUC from time from time zero to 24 hours post-dose,
$AUC_{0-inf}$: AUC from zero to infinite time,
$C_{max}$: maximum plasma concentration,
[1]Geometric mean (% Coefficient of variation [CV]),
DRSP: drospirenone,
E4: estetrol,
EE: ethinylestradiol,
ND: not determined.
For comparison purposes, only data from Caucasian subjects are reported in this table.
*Blode et al., Pharmacokinetics of drospirenone and ethinylestradiol in Caucasian and Japanese women, Eur J Contracept Reprod Health Care, 2012, Table 2, Study 1/3.
**MIT-Es0001-C103/C101/C109/C110: clinical trials conducted by the inventors.

TABLE 2

Pharmacokinetic parameters of DRSP after repeated oral administration alone or in combination with estrogens (EE and E4).

Table 2: Multiple Dose comparative study between EE/DRSP and E4/DRSP COC's

| Parameters | (12 days) DRSP 4 mg (Slynd ™) US Product Information + Richter W et al.* | (21 days) EE 0.03 mg DRSP 3 mg (Yasmin ™) US Product Information | (21 days) EE 0.02 mg DRSP 3 mg (Yaz ™) US Product Information | (21 days) EE 0.02 mg DRSP 3 mg (Yaz ™) Blode H et al. Study 3** Caucasian (n = 23) | (28 days) EE 0.02 mg DRSP 3 mg (Yaz ™) Wiesinger et al.*** Caucasian (n = 20) | (14 days) E4 15 mg/ DRSP 3 mg Study MIT-Es0001-C103 Caucasian (n = 10) | (10 days) E4 15 mg/ DRSP 3 mg Study MIT-Es0001-C106 Caucasian (n = 10) |
|---|---|---|---|---|---|---|---|
| $C_{max}$ (ng/mL) | 42.3 (26.3) 1 | Cycle 1: 87.5 (59) Cycle 6: 84.2 (19) Cycle 9: 81.3 (19) Cycle 13: 78.7 (18) | 70.3 (15) 1 | 70.3 (15) 1 | 53.8 (19.7) 1 | 48.7 (24.6) 1 | 39.7 (22.4) 1 |

TABLE 2-continued

Pharmacokinetic parameters of DRSP after repeated oral administration alone or in combination with estrogens (EE and E4).

Table 2: Multiple Dose comparative study between EE/DRSP and E4/DRSP COC's

| Parameters | (12 days) DRSP 4 mg (Slynd ™) US Product Information + Richter W et al.* | (21 days) EE 0.03 mg DRSP 3 mg (Yasmin ™) US Product Information | (21 days) EE 0.02 mg DRSP 3 mg (Yaz ™) US Product Information | (21 days) EE 0.02 mg DRSP 3 mg Blode H et al. Study 3** Caucasian (n = 23) | (28 days) EE 0.02 mg DRSP 3 mg (Yaz ™) Wiesinger et al.*** Caucasian (n = 20) | (14 days) E4 15 mg/ DRSP 3 mg Study MIT-Es0001-C103 Caucasian (n = 10) | (10 days) E4 15 mg/ DRSP 3 mg Study MIT-Es0001-C106 Caucasian (n = 10) |
|---|---|---|---|---|---|---|---|
| $AUC_{inf}$ (ng · h/mL) | NA | NA | NA | 1811 (33) 1 | ND | ND | ND |
| $AUC_{0-24}$ (ng · h/mL) | 586.2 (25.0) 1 | Cycle 1: 827 (23) Cycle 6: 930 (19) Cycle 9: 957 (23) Cycle 13: 968 (24) | 763 (17) 1 | 763 (17) 1 | 648 (23.2) 1 | 519 (27.7) 1 | 442 (25.4) 1 |
| Method | Validated HPLC | | | Validated radioimmunoassay (data are identical to Blode H et al.) | Validated radio-immunoassay | Validated HPLC and LC-MS/MS | Validated HPLC and LC MS/MS | Validated HPLC and LC MS/MS |

AUC = area under the plasma concentration-versus-time curve,
$AUC_{0-24}$ = AUC from time from time zero to 24 hours post-dose,
$AUC_{0-inf}$ = AUC from zero to infinite time,
$C_{max}$ = maximum plasma concentration,
GM CV = coefficient of variation of the geometric mean,
DRSP = drospirenone,
E4 = estetrol,
EE = ethinylestradiol,
GM = geometric mean,
ND = not determined.
For comparison purpose with data generated by the sponsor, only data from Caucasian subjects were reported in this table.
*Richter et al., Comparative pharmacokinetic estimates of drospirenone alone and in combination with ethinyl estradiol after single and repeated oral administration in healthy females, Contraception, 2020)
**Blode et al., Pharmacokinetics of drospirenone and ethinylestradiol in Caucasian and Japanese women, Eur J Contracept Reprod Health Care, 2012, Table 2, study 3.
***Wiesinger etal., Pharmacokinetic interaction between the CYP3A4 inhibitor ketoconazole and the hormone drospirenone in combination with ethinylestradiol or estradiol, Br J Clin Pharmacol, 2015, Table 4.
**MIT-Es0001-C103/106: clinical trials conducted by the inventors.

Example 2. A Comparative Bioavailability Study Between a Combined Oral Contraceptive (COC) Containing Estetrol (E4) 15 mg and Drospirenone (DRSP) 3 mg and a COC Containing Ethinylestradiol (EE) 0.02 mg and DRSP 3 mg (Single Dose Study)

2.1. Study Concept and Objectives

An open open-label, single dose, randomized, two-period, two-treatment, two-way crossover, comparative bioavailability study between a combined oral contraceptive (COC) containing estetrol (E4) 15 mg and drospirenone (DRSP) 3 mg (i.e. Treatment A) and a COC containing ethinylestradiol (EE) 0.02 mg and DRSP 3 mg (Yaz™ or Yasmin™, i.e. Treatment B) in healthy female volunteers.

The primary objective of the study was to compare the rate and extent of absorption of DRSP after a single oral dose of E4/DRSP 15/3 mg combination (test product) and ethinylestradiol (EE)/DRSP 0.02/3 mg combination (reference product) administered under fasting conditions. The secondary objective of the study was to assess the general safety of a single oral dose of E4/DRSP 15/3 mg combination and EE/DRSP 0.02/3 mg combination in healthy female volunteers. Subjects were selected from a panel of volunteers recruited by Quotient Sciences and were screened for inclusion in the study up to 28 days before dosing. For detailed inclusion and exclusion criteria, reference is made to the publicly available clinical study report of study MIT-Es001-C112 (QSC203723).

A two-period, two-way, crossover design was the most appropriate to compare the PK of two different treatments, as it allowed within-subject comparisons and reduced the impact of potential period effects. The design of this study was in line with recommendations of the US Food and Drug Administration (FDA) regarding the conduct of bioavailability studies (U.S. Department of Health and Human Services Food and Drug Administration Center for Drug Evaluation and Research, Guidance for Industry; Bioavailability and Bioequivalence Studies Submitted in NDAs or INDs—General Considerations, March 2014). Subjects were allowed to withdraw their consent at any time for any reason. Subjects could be discontinued by the Investigator in the case of emerging effects of such a nature that the risk/benefit ratio was unacceptable, in the case of poor compliance, or in case of protocol violations. For this PK study, subjects could also be discontinued if there were difficulties in blood collection.

Subjects received the first treatment (Treatment A or B, depending on the randomization) on Period 1 Day 1. After a period of at least 14 days (washout), subjects received the second treatment on Period 2 Day 1 (Treatment B or A).

After each dose, subjects had blood samples taken on a regular basis for up to 5 days for PK measurements.

Emphasis is hereby made that the study described in this section (section 2) is a single dose study. It is evident that certain parameters will yield more statistically relevant results in a multiple dose study, which is outlined in section 3. Nevertheless, certain trends such as lower DRSP AUC values achieved herein are already apparent even after analysis of the pharmacokinetic profile of the single dose administration. The results of Example 2 therefore do not affect the validity of the multiple dose study described in Example 1, 3 and 4.

2.2. Pharmacokinetic Measurements 2.2.1. Sample Collection—DRSP Bioanalysis

Venous blood samples were collected into a 4.0 mL Sodium Heparin tubes. The tube was gently inverted 8 to 10 times to mix with the anticoagulant. Immediately after mixing, the tubes were stored in an ice bath, and centrifuged within 60 minutes of collection for 10 minutes at <4° C. at 1500 g. Immediately following centrifugation, aliquots of the separated plasma were transferred into storage cryotubes. For Treatment A, three aliquots of plasma, each containing approximately 0.5 mL, were produced. For Treatment B, two aliquots of plasma, one of approximately 0.5 mL and another of approximately 1.0 mL, were produced. The tubes were immediately capped, and stored in an upright position in a freezer at −20° C. (±5° C.) within 90 minutes of sample collection until shipment.

2.2.2. Analytical Methods

The exact times of blood sampling were recorded in the source workbook and actual collection times were used for PK analysis. Determination of DRSP in plasma was performed using a validated liquid chromatography-tandem mass spectrometry (LC-MS/MS) method in accordance to Good Laboratory Practice (GLP) requirements applicable to this type of study identified in the Organization for Economic Co-operation and Development (OECD) Principles of GLP (OECD principles on Good Laboratory Practice; ENV/MC/CHEM(98)17. 1998.).

2.3. Pharmacokinetic Results and Statistical Evaluation

The resulting statistical analysis is shown in Table 3.

TABLE 3

Statistical evaluation of pharmacokinetic values. Geometric Mean (Geometric CV %) Plasma Pharmacokinetic Parameters for DRSP Following Single Oral Doses of DRSP in Combination with E4 (E4/DRSP 15/3 mg Test Formulation) and EE (EE/DRSP 0.02/3 mg [Yaz™] Reference Formulation) to Healthy Female Subjects.
Table 3: Statistical evaluation of pharmacokinetic values

| Treatment | Statistic | tlag (h) | tmax (h) | tlast (h) | Cmax (ng/mL) | AUC0-24 (ng · h/mL) | AUC0-tlast (ng · h/mL) | AUC0-inf (ng · h/mL) |
|---|---|---|---|---|---|---|---|---|
| A (test) (N = 27) | n | 27 | 27 | 27 | 27 | 27 | 27 | 26 |
| | Mean | 0.252 | 1.820 | 114.720 | 35.8 | 234 | 467 | 521 |
| | SD | 0.120 | 0.698 | 12.153 | 7.77 | 48.1 | 118 | 140 |
| | CV % | 47.7 | 38.4 | 10.6 | 21.7 | 20.5 | 25.3 | 26.9 |
| | Median | 0.250 | 2.000 | 120.000 | 34.8 | 236 | 452 | 488 |
| | Min | 0.00 | 1.00 | 72.00 | 22.2 | 157 | 310 | 348 |
| | Max | 0.50 | 3.02 | 120.68 | 51.5 | 371 | 794 | 885 |
| | Geom. Mean | NC | NC | 113.975 | 35.0 | 229 | 453 | 504 |
| | Geom. Mean | NC | NC | 12.2 | 22.4 | 20.5 | 25.0 | 26.3 |
| B (reference) N = 27) | n | 27 | 27 | 27 | 27 | 27 | 27 | 27 |
| | Mean | 0.223 | 1.825 | 117.407 | 37.1 | 241 | 509 | 577 |
| | SD | 0.106 | 1.168 | 7.716 | 8.70 | 57.0 | 136 | 168 |
| | CV % | 47.6 | 64.0 | 6.6 | 23.5 | 23.6 | 26.8 | 29.2 |
| | Median | 0.250 | 1.500 | 120.000 | 38.3 | 229 | 495 | 543 |
| | Min | 0.00 | 0.75 | 96.00 | 19.7 | 166 | 320 | 349 |
| | Max | 0.5 | 6.00 | 121.05 | 63.2 | 403 | 939 | 1090 |
| | Geom. Mean | NC | NC | 117.133 | 36.0 | 236 | 493 | 556 |
| | Geom. Mean | NC | NC | 7.2 | 25.0 | 22.3 | 25.9 | 28.0 |

Tlag: Time prior to the first measurable concentration.
Tmax: Time of maximum observed concentration.
Tlast: Time of the last measurable concentration.
Cmax: Maximum observed concentration.
AUC0-24: AUC from time 0 to 24 h post-dose.
AUC0-tlast: AUC from time 0 to the time of last measurable concentration.
AUC0-inf: AUC from time 0 extrapolated to infinity.

For statistical evaluation of pharmacokinetic values, the relative bioavailability (Frel) can be calculated from Table 3.1. according to Formula (III):

$$Frel = \left\{ \frac{AUC \text{ or } Cmax \text{ (test)}}{AUC \text{ or } Cmax \text{ (reference)}} \right\} \times 100 \quad \text{Formula (III)}$$

TABLE 4

Assessment of Relative Bioavailability: PK Analysis Set. Plasma Pharmacokinetic Parameters for DRSP Following Single Oral Doses of DRSP in Combination with E4 (E4/DRSP 15/3 mg Test Formulation) and EE (EE/DRSP 0.02/3 mg [Yaz ™] Reference Formulation) to Healthy Female Subjects.
Table 4. Assessment of Relative Bioavailability: PK Analysis Set.

| PK parameter | A (test) | | B (reference) | | Ratio (%) (2) | 90% CI (%) (3) | P-value (4) | CVw (5) |
|---|---|---|---|---|---|---|---|---|
| | n | Adj. Geo Mean (1) | n | Adj. Geo Mean (1) | | | | |
| Cmax (ng/mL) | 27 | 35.0 | 27 | 36.0 | 97.26 | (88.63; 106.72) | 0.61 | 20.2 |
| AUC0-tlast (ng · h/mL) | 27 | 454 | 27 | 493 | 92.11 | (88.68; 95.68) | 0.001 | 8.18 |
| AUC0-inf (ng · h/mL) | 26 | 504 | 26 | 550 | 91.65 | (87.89; 95.56) | 0.002 | 8.84 |

(1) Adj. geo mean = adjusted geometric mean from the model,
(2) Ratio of the adj. geo means with comparison presented as test/reference,
(3) CI = confidence interval for ratio of adj. geo means
(4) P-value from two-sided test (null hypothesis of no difference),
(5) CVw = intra-subject variability.

The results indicate that the average overall exposure levels of DRSP, as measured by $AUC_{0\text{-}tlast}$, for the E4/DRSP 15/3 mg test formulation were 92.11% of those of the EE/DRSP 0.02/3 mg (Yaz™) reference formulation. The lower bound and upper bound of the 90% CI indicate that the true measure of relative bioavailability is unlikely to be less than 88.68% or more than 95.68%. The difference between treatments in $AUC_{0\text{-}tlast}$ was statistically significant (p=0.001). The period effect (i.e., marginally higher exposure levels in Period 2 compared with Period 1) was statistically significant at the 10% level (p=0.037), whereas the sequence effect was not (p=0.46). There was no evidence of any carryover from Period 1 into Period 2, i.e., all pre-dose concentrations for Period 2 were non-quantifiable.

A similar pattern of results was obtained for $AUC_{0\text{-}inf}$ to those of $AUC_{0\text{-}tlast}$, i.e., average overall exposure levels of DRSP, as measured by $AUC_{0\text{-}inf}$ for the E4/DRSP 15/3 mg test formulation were 91.65% of those of the EE/DRSP 0.02/3 mg (Yaz™) reference formulation. The lower bound and upper bound of the 90% CI indicate that the true measure of relative bioavailability is unlikely to be less than 87.89% or more than 95.56%. The difference between treatments in $AUC_{0\text{-}inf}$ was statistically significant (p=0.002). The period effect (i.e., marginally higher exposure levels in Period 2 compared with Period 1) was statistically significant at the 10% level (p=0.010), whereas the sequence effect was not (p=0.40).

2.4. Pharmacokinetic and Statistical Discussion

Following single oral administration of DRSP as the EE/DRSP 0.02/3 mg (Yaz™) reference formulation, DRSP was rapidly absorbed with median $t_{max}$ occurring at 1.50 h. The geometric mean terminal $t_{1/2}$ of DRSP was 37.73 h, which is consistent with those observed previously (Estetra SPRL. Clinical Study Protocol: An open-label, single dose, randomized, two-period, two-treatment, two-way crossover, comparative bioavailability study between a combined oral contraceptive (COC) containing estetrol (E4) 15 mg and drospirenone (DRSP) 3 mg and a COC containing ethinylestradiol (EE) 0.02 mg and DRSP 3 mg (Yaz®) in healthy female volunteers. Version 1.1. 18 Dec. 2019).

Administration of the E4/DRSP 15/3 mg test formulation showed no change in DRSP absorption compared with the EE/DRSP 0.02/3 mg (Yaz™) reference formulation, with a median $t_{max}$ of 2.00 h. Elimination of DRSP was unchanged in the E4/DRSP 15/3 mg test formulation, with geometric mean terminal $t_{1/2}$ of 38.20 h.

Variability associated with exposure was similar between treatments, with geometric mean CV % ranging from 22.4% to 25.0% for $C_{max}$ and 20.5% to 28.0% for AUC across both treatments.

Peak plasma exposure to DRSP, based on $C_{max}$, following administration of the E4/DRSP 15/3 mg test formulation was comparable with the EE/DRSP 0.02/3 mg (Yaz®) reference formulation, with resultant relative bioavailabilities (90% CI) of 97.26% (88.63%, 106.72%), confirming there was no statistically significant difference.

Overall exposure based on $AUC_{0\text{-}tlast}$ and $AUC_{0\text{-}inf}$ was lower following administration of the E4/DRSP 15/3 mg test formulation than the EE/DRSP 0.02/3 mg (Yaz™) reference formulation, with the difference in the values being statistically significant, with ratios (90% CI) of 92.11% (88.68%, 95.68%) and 91.65% (87.89%, 95.56%), respectively. It was noted that there was very low intra-subject variability associated with the results of the formal statistical analysis, which resulted in relatively minor differences in treatment and periods being declared statistically significant. Period effects were not considered to have impacted the overall interpretation of the results or the conclusions.

Example 3. A Comparative Bioavailability Study Between a Combined Oral Contraceptive (COC) Containing Estetrol (E4) 15 mg and Drospirenone (DRSP) 3 mg and a COC Containing Ethinylestradiol (EE) 0.03 mg and DRSP 3 mg (Single Dose and Multiple Dose Study)

3.1. Study Concept and Objectives

An open-label, single dose and multiple dose, randomized, two-period, two-treatment, two-way crossover, comparative bioavailability study between a combined oral contraceptive (COC) containing estetrol monohydrate (E4) 15 mg and drospirenone (DRSP) 3 mg and a COC containing ethinylestradiol (EE) 0.03 mg and DRSP 3 mg (Yasmin™) in healthy female volunteers.

The primary objective is to compare the rate and extent of absorption of DRSP after a single dose and a 14-day multiple dose of E4/DRSP 15/3 mg combination (test product) and EE/DRSP 0.03/3 mg combination (reference product) administered under fasting conditions. For the multiple dose administration, only the last administration (prior to pharmacokinetic [PK] measurement) will be performed under fasting conditions. The secondary objective is to assess the general safety of a single dose and a 14-day multiple dose of E4/DRSP 15/3 mg combination and EE/DRSP 0.03/3 mg combination in healthy female volunteers.

The study consists of a screening period of up to 28 days, two treatment periods of 24 days each, and a follow up visit on the last day of Treatment Period 2. Subjects will receive two treatments: E4/DRSP 15/3 mg (Treatment A) and EE/DRSP 0.03/3 mg (Treatment B). Treatments will be given sequentially starting with A (A-B) or with B (B-A). Subjects will be randomized to receive the treatment sequence A-B or B-A in the morning of Period 1, Day 1. Subjects will receive orally one single dose of either Treatment A or Treatment B on Day 1 of Treatment Period 1, then, after a period of 4 days with no treatment (Days 2 to 5), will receive the same treatment for 14 days on Days 6 to 19. After a washout period of at least 14 days, subjects will receive orally one single dose of the other treatment (Treatment B or Treatment A) on Day 1 of Treatment Period 2, then after a period of 4 days with no treatment (Days 2 to 5), will receive the same treatment for 14 days on Days 6 to 19.

Half of the subjects will be randomized to receive Sequence A-B (Treatment A followed by Treatment B) and half will be randomized to receive sequence B-A (Treatment B followed by Treatment A).

Both test formulations (indicated above) will be administered orally: Single Dose: after at least 10-h overnight fast. Multiple Dose: 14-day once daily administration at the same time of the day; the last dose must be taken after at least 10-h overnight fast.

3.2. Study Endpoints (Pharmacokinetics)
3.2.1. Primary PK Endpoints

The following non-compartmental PK parameters will be calculated for DRSP after treatment with E4/DRSP 15/3 mg and after treatment with EE/DRSP 0.03/3 mg:

Single Dose
  Maximal plasma concentration ($C_{max}$);
  Area under the plasma concentration vs. time curve (AUC) from time 0 until the last observed quantifiable concentration ($AUC_{0-tlast}$);
  AUC from time 0 to infinite time ($AUC_{0-inf}$)
Multiple Dose (after the Last Administration)
  Cmax;
  AUC from time 0 to 24 hours ($AUC_{0-24}$).

3.2.2. Secondary PK Endpoints

The following non-compartmental PK parameters will be calculated for DRSP after treatment with E4/DRSP 15/3 mg and after treatment with EE/DRSP 0.03/3 mg:

Single Dose and Multiple Dose (after the Last Administration)
  Time to reach Cmax ($t_{max}$);
  Apparent terminal elimination half-life ($t_{1/2}$);
  AUC extrapolated from time of last measurable plasma concentration to infinity, as a percentage of $AUC_{0-inf}$ (AUC % ext);
  Apparent terminal elimination rate constant ($\lambda z$);
  Apparent total body clearance (CL/F); Apparent volume of distribution (Vz/F).
Single Dose
  AUC0-24 after single dose administration.
Multiple Dose (after the Last Administration)
  $AUC_{0-tlast}$;
  $AUC_{0-inf}$;
  Average concentration at steady-state (Cav);
  Minimum concentration over the last dosing interval at steady-state (Cmin);
  Peak-through fluctuation at steady-state (PTF %).

In addition, the accumulation ratio (RAUC) will be computed as the steady-state vs. single-dose ratio of ($AUC_{0-24}$).

3.2.3. Safety Endpoints:

Safety will be assessed by the monitoring of treatment-emergent adverse events (TEAEs), physical examination, vital signs, clinical laboratory tests and electrocardiogram (ECG) results.

A 12-lead ECG will be recorded at screening, on Day 19 and Day 21 of Treatment Period 1, and on Day −1, Day 19 and Day 21 of Treatment Period 2. It will also be recorded at ET if ET occurs before or on Day 20. Measurements will be performed after a period of rest (in supine position) of at least 10 minutes. The ECG recording will include rhythm, ventricular rate, PR, QRS, QT and QTcF intervals.

3.2.4. PD Endpoints:

The PD effect will be assessed by measuring the plasma aldosterone concentration, plasma renin (direct renin concentration [DRC] and plasma renin activity [PRA]), angiotensinogen, angiotensin (I and II), free testosterone and CRP at baseline and after the last administration of the 14-day MD (raw concentration and change from baseline). PD assessments include the assessment of aldosterone, plasma renin (DRC and PRA), angiotensinogen, angiotensin (I and II), free testosterone and CRP. Blood samples for PD assessments will be collected on Day −1 and pre-dose on Day 19 of each treatment period.

3.3. Statistical Methods

Continuous variables will be summarized using the following descriptive statistics: arithmetic mean, standard deviation (SD), minimum, median, maximum, coefficient of variation (CV %), and number of subjects. In addition, the geometric mean and CV % of geometric mean will be calculated for DRSP plasma concentrations and PK parameters except $t_{max}$.

Frequency distributions for all categorical variables will be presented using counts and percentages. The data listings, descriptive statistics, statistical analysis, summary tables and graphs of this study will be generated using SAS® software.

DRSP concentrations will be summarized by treatment and time point using descriptive statistics. Pharmacokinetic PK parameters based on DRSP concentrations will be summarized by treatment. Graphical displays will also be provided for individual and mean DRSP concentration data.

In order to compare the bioavailability of DRSP between E4/DRSP and EE/DRSP, the natural log transformed parameters will be evaluated using an analysis of variance (ANOVA). This model will be separately applied to $C_{max}$, $AUC_{0-tlast}$ and $AUC_{0-inf}$ after single dose administration and to $C_{max}$ and $AUC_{0-24}$ after the last multiple dose on Day 19. The model for each PK parameter will include sequence, subject within sequence (random effect), period, and treatment. The mean differences between treatments together with their associated 90% confidence intervals (CIs) will be estimated for the log-transformed values of each parameter. CIs will be based on the adjusted means estimation using the mean square error from the ANOVA models. The differences and the CIs computed in the log-scale will be back-transformed to obtain the geometric mean test to reference ratios and the 90% CIs of each parameter on the original scale.

Example 4. Comparative Study with Multiple COCs to Assess the Impact on Free Testosterone and C-Reactive Protein 4.1. Materials and Methods
4.1.1. Study Design This was a single center, randomized, open-label, controlled, three-arm study in healthy females conducted from September 2016 through October 2017 at Dinox BV, Groningen, the Netherlands (EudraCT 2016-001316-37, Clinicaltrials.gov NCT02957630). The study was approved by an independent ethics committee and written informed consent was obtained from all participants before study entry. The study was conducted in accordance with Declaration of Helsinki and the ICH Good Clinical Practice guidelines.

The study consisted of a pretreatment cycle (baseline) followed by 6 treatment cycles of 28 days, and 5 visits: a screening visit, a pretreatment/randomization visit, two treatment visits (at cycle 3 and at cycle 6), and an end-of-study visit.

4.1.2. Study Population

Healthy females aged 18-50 years with a body mass index (BMI) between 18.0 and 30.0 kg/m$^2$, inclusive, and a natural menstrual cycle of 35 days or shorter were eligible for inclusion. Women with contraindications for the use of oral contraceptives, with dyslipoproteinemia, or using antilipidemic agents, were excluded from participation. Hormonal contraceptives and the use of concomitant medication interacting with COCs was not allowed from two cycles before the start of treatment and during the study treatment.

4.1.3. Study Treatment

Eligible subjects were stratified by duration since previous hormonal contraception use (2 cycles or more than 2 cycles without hormonal contraceptive use before start study treatment) and by age (<35 years or >35 years of age) to ensure an even distribution over treatment groups. The subjects were assigned to one of the following treatments: 15 mg E4 (as monohydrate, equivalent to 14.2 mg as anhydrate) combined with 3 mg DRSP (E4/DRSP), 30 mcg EE combined with 150 mcg LNG (EE/LNG), or 20 mcg EE combined with 3 mg DRSP (EE/DRSP). Subjects took one tablet daily for 6 consecutive cycles of 28 days. The E4/DRSP and EE/DRSP treatments were provided in a 24-day active/4 day placebo regimen, and EE/LNG in a 21 day active/7 day placebo regimen. E4/DRSP was manufactured by Haupt Pharma, Munster, Germany and provided by Estetra SPRL, Liege, Belgium. EE/LNG (Melleva™ 150/30, Leon Farma, Spain) and EE/DRSP (Yaz™, Bayer Healthcare, Germany) were obtained from the local pharmacy. Study treatment started on the first day of menses following the pretreatment cycle. Treatment compliance was verified by the use of a diary and by checking returned packages.

4.1.4. Study Assessments and Outcome Parameters

The study included the following outcome parameters:

Endocrine function: prolactin, follicle stimulating hormone (FSH), luteinizing hormone (LH), estradiol (E2), progesterone (P), thyroid stimulating hormone (TSH), free thyroxine (fT3)/free triiodothyronine (fT4), dihydroepiandrostenedione (DHEAS), androstenedione, total testosterone (T), free T, dihydrotestosterone (DHT), total cortisol, and aldosterone;

Liver proteins: C-reactive protein (CRP), cortisol binding globulin (CBG), sex hormone binding globulin (SHBG), thyroxin binding globulin (TBG), and angiotensinogen;

Blood samples for measurement of these parameters were taken between days 18 and 21 at baseline and during cycles 3 and 6. Plasma, serum and whole blood samples were shipped to a central laboratory (BARC laboratories, Gent, Belgium) for analysis. Serum samples for E2 assessment were shipped to ABL in Assen, the Netherlands. Details on the analytical methods, including reference ranges are provided in Table 5.

TABLE 5

Details on analytical methods used and reference ranges

| Parameter | Method | Instrument | Reference Range | Matrix |
|---|---|---|---|---|
| Endocrine parameters | | | | |
| Prolactin | ECLIA | Roche Cobas e | 4.8-23.3 ng/mL | SERUM |
| FSH | ECLIA | Roche Cobas e | NA | SERUM |
| LH | ECLIA | Roche Cobas e | NA | SERUM |
| E2 | Mass spectrometry | LC/MS-MS | | SERUM |
| P | ECLIA | Roche Cobas e | ≤23.9 ng/mL | SERUM |
| TSH | ECLIA | Roche Cobas e | 0.27-4.20 mU/L | SERUM |
| fT3 | ECLIA | Roche Cobas e | 2.00-4.40 pg/mL | SERUM |
| fT4 | ECLIA | Roche Cobas e | 0.93-1.70 ng/dL | SERUM |
| DHEA | ECLIA | Roche Cobas e | 35-407 µg/dL | SERUM |
| Androstenedione | RIA | Tecan Evo | 1.4-12.0 nmol/L | SERUM |
| Total T | Calculation | Calculation | 8-48 ng/dL | SERUM |
| Free T | ECLIA | Roche Cobas e | 0.1-1.0 ng/dL | SERUM |
| DHT | LC-MSMS | Agilent LC/MS | 0.17-0.96 nmol/L | SERUM |
| Total cortisol | ECLIA | Roche Cobas e | 2.3-19.4 µg/dL | SERUM |
| Aldosterone | RIA | Tecan Evo | 83-405 pmol/L | SERUM |
| Liver parameters | | | | |
| CRP | Turbidimetry | Roche Cobas | <0.50 mg/dL | SERUM |
| CBG | RIA | LKB Gamma counter or PerkinElmer Wizard | 35-50 µg/mL | SERUM |
| SHBG | ECLIA | Roche Cobas e | 32.4-128.0 nmol/L | SERUM |
| TBG | CLIA | Siemens Immulite | 14.0-31.0 mg/L | SERUM |
| Angiotensinogen* | EIA | Microplate reader | NA | PLASMA |

*all measurements were done on blood serum except for angiotensinogen, which was measured in blood plasma.

4.1.5. Statistical Analysis

All randomized subjects who received at least one dose of the study medication, had at least one post-treatment endocrine assessment and without any major protocol deviation impacting these assessments, were included in the analysis of the endocrine parameters (per protocol dataset). Parameters were summarized using descriptive statistics (n, mean, standard deviation [SD], minimum, median, maximum and coefficient of variation [CV]), no formal statistical analysis was planned.

Additional exploratory non-parametric analysis was performed on the absolute change from baseline of the endocrine parameters and liver proteins. Only data from cycle 6 were included in this analysis, because this time-point is most relevant to evaluate the effect of long term treatment.

To explore the difference between cycle 6 and baseline a signed rank test was used. To explore treatment differences in the change from baseline at cycle 6, the Kruskal-Wallis test was used. In case this analysis indicated a possible difference, pairwise comparison of the treatment was done using the Dwass-Steel-Critchlow-Fligner procedure. The alpha level was set at 0.05. Herein only data obtained at baseline and cycle 6 are reported.

4.2. Results

4.2.1. Study Population

A total of 101 subjects were randomized, 98 received study treatment and 88 subjects completed the study (FIG. 1). Demographics are summarized in Table 6. There were no apparent group differences at baseline.

TABLE 6

Mean demographic data at study entry.

| | 15 mg E4/<br>3 mg DRSP<br>n = 38 | 30 µg EE/<br>150 µg LNG<br>n = 29 | 20 µg EE/<br>3 mg DRSP<br>n = 31 | Total<br>n = 98 |
|---|---|---|---|---|
| Age, y, (range) | 26.7 (19-47) | 26.2 (18-44) | 25.6 (18-40) | 26.2 (18-47) |
| Weight, kg (range) | 68.1 (53.1-97.8) | 65.6 (50.4-79.2) | 63.2 (50.3-80.7) | 65.8 (50.3-97.8) |
| Height, cm (range) | 170.8 (159-188) | 169.6 (160-181) | 168.4 (155-183) | 169.7 (155-188) |
| BMI, kg/m$^2$ (range) | 23.3 (19.2-30.0) | 22.8 (18.3-29.8) | 22.3 (18.6-26.7) | 22.8 (18.3-30.0) |

BMI: Body Mass Index.

4.2.2. Endocrine Parameters

Androgen parameters measured during the study included androstenedione, dehydroepiandrosterone sulfate, dihydrotestosterone, testosterone, free testosterone and SHBG. Treatment with E4/DRSP, EE/LNG and EE/DRSP was associated with a decrease in androgen concentrations. Androstenedione (from −31.0% for E4/DRSP up to −49.0% for EE/DRSP) and free T (from −50.0% for E4/DRSP up to −71.0% for EE/DRSP) levels were decreased in all treatment groups, but with a higher decrease for EE/DRSP treatment. In parallel, an increase in the median concentration of SHBG by 55%, 74% and 251% in groups treated with E4/DRSP, EE/LNG and EE/DRSP, respectively, was observed. In the E4/DRSP, EE/LNG and EE/DRSP groups, decreases in median concentrations of dehydroepiandrosterone (−10.5%, −16.0%. −27.0%) and dihydrotestosterone (−13.0%, −25.0%, −3.5%) were also observed. Cortisol was increased with more than 100% during treatment with EE/LNG (109.0%) and EE/DRSP (107.0%), while with E4/DRSP only a mild increase of 26.0% was observed. Aldosterone levels were increased with E4/DRSP (103.0%) and EE/DRSP (179.5%), while for EE/LNG a decrease (−40.0%) was observed.

In the tables, the changes from baseline in endocrine parameters mentioned above reaching statistical significance (p<0.05) are depicted in bold.

TABLE 7

Endocrine parameters. Median (min, max) at baseline and at cycle 6 and change from baseline at cycle 6. Values in bold represent statistical significant changes from baseline (p < 0.05) in the additional exploratory analysis.

| Parameter | | 15 mg E4/<br>3 mg DRSP<br>n = 34 | 30 µg EE/<br>150 µg LNG<br>n = 27 | 20 µg EE/<br>3 mg DRSP<br>n = 30 |
|---|---|---|---|---|
| Prolactin | Baseline | 19.60 (6.6, 45.4) | 18.90 (10.3, 29.3) | 22.00 (9.9, 48.8) |
| (ng/mL) | Cycle 6 | 25.10 (9.9, 83.8) | 23.80 7.6 51.3 | 18.60 (6.8, 65.6) |
| | % CFB | 19.5 (−33.0, 201.0) | 22.0 (−52.0, 230.0) | −3.0 (−43.0, 148.0) |

TABLE 7-continued

Endocrine parameters. Median (min, max) at baseline and at cycle 6 and change from baseline at cycle 6. Values in bold represent statistical significant changes from baseline ($p < 0.05$) in the additional exploratory analysis.

| Parameter | | 15 mg E4/<br>3 mg DRSP<br>n = 34 | 30 µg EE/<br>150 µg LNG<br>n = 27 | 20 µg EE/<br>3 mg DRSP<br>n = 30 |
|---|---|---|---|---|
| FSH<br>(mIU/mL) | Baseline | 4.50 (1.6, 13.0) | 4.50 (1.8, 24.1) | 5.10 (1.6, 14.3) |
| | Cycle 6 | 4.55 (0.5, 9.6) | 1.00 (0.1, 4.2) | 0.70 (0.1, 7.8) |
| | % CFB | 30.5 (−90.0, 169.0) | −84.0 (−100, 110.0) | −64.0 (−99.0, 256.0) |
| LH (mIU/mL) | Baseline | 7.25 (1.3, 36.3) | 8.40 (2.8, 136.7) | 9.35 (1.7, 75.2) |
| | Cycle 6 | 6.10 (0.2, 13.0) | 0.70 (0.1, 6.8) | 0.60 (0.1, 8.4) |
| | % CFB | −7.5 (−98.0, 392.0) | −92.0 (−100, 61.0) | −90.0 (−100, 212.0) |
| E2 (pg/mL) | Baseline | 93.3 (34.8, 195.0) | 114.0 (56.3, 487.00) | 96.0 (42.0, 266.0) |
| | Cycle 6 | 8.3 (5.0, 60.6) | 5.0 (5.0, 7.84) | 5.0 (5.0, 73.2) |
| | % CFB | −90.0 (−97.0, −15.0)[#] | −98.0 (−98.0, −97.0)[#] | −93.0 (−98.0, −47.0)[#] |
| Progesterone<br>(ng/mL) | Baseline | 5.75 (0.2, 22.3) | 6.70 (0.2, 20.6) | 1.15 (0.2, 13.2) |
| | Cycle 6 | 0.30 (0.2, 0.7) | 0.20 (0.2, 0.6) | 0.40 (0.2, 0.7) |
| | % CFB | −96.0 (−99.0, 100.0) | −95.0 (−99.0, 150.0) | −60.0 (−98.0, 100.0) |
| TSH (mU/L) | Baseline | 2.050 (1.24, 4.93) | 2.070 (0.61, 4.84) | 2.435 (0.89, 5.45) |
| | Cycle 6 | 2.280 (0.15, 5.17) | 2.070 (1.07, 6.86) | 2.690 (0.84, 6.10) |
| | % CFB | 6.0 (−90.0, 109.0) | 12.0 (−41.0, 428.0) | 7.0 (−49.0, 76.0) |
| fT3 (pg/dL) | Baseline | 3.260 (2.70, 4.01) | 3.380 (2.31, 3.94) | 3.230 (2.61, 4.67) |
| | Cycle 6 | 3.280 (2.64, 4.06) | 3.400 (2.74, 4.48) | 3.430 (2.41, 4.16) |
| | % CFB | −4.5 (−23.0, 25.0) | 6.0 (−26.0, 39.0) | 2.0 (−36.0, 35.0) |
| fT4 (ng/dL) | Baseline | 1.140 (0.87, 1.50) | 1.150 (0.86, 1.36) | 1.225 (0.91, 1.62) |
| | Cycle 6 | 1.205 (0.90, 1.49) | 1.240 (0.91, 1.53) | 1.230 (0.96, 1.62) |
| | % CFB | 4.0 (−12.0, 25.0) | 6.0 (−14.0, 36.0) | 2.0 (−21.0, 20.0) |
| DHEAS<br>(µg/dL) | Baseline | 273.5 (94, 535) | 265.0 (71, 773) | 239.0 (115, 535) |
| | Cycle 6 | 251.5 (92, 538) | 208.0 (74, 350) | 179.0 (62, 314) |
| | % CFB | −10.5 (−41.0, 32.0) | −16.0 (−41.0, 21.0) | −27.0 (−60.0, 13.0) |
| Androstenedione<br>(nmol/L) | Baseline | 9.90 (6.4, 22.6) | 10.70 (2.4, 21.9) | 10.05 (4.2, 16.2) |
| | Cycle 6 | 7.5 (3.6, 12.1) | 5.40 2.6, 10.6) | 5.90 (2.1, 13.1) |
| | % CFB | −31.0 (−72.0, 44.0) | −49.0 (−80.0, 75.0) | −40.0 (−70.0, 26.0) |
| Testosterone<br>(ng/dL) | Baseline | 38.0 (12, 71) | 41.0 (12, 76) | 34.0 (18, 79) |
| | Cycle 6 | 24.5 (12, 47) | 19.0 (12, 41) | 21.0 (12, 67) |
| | % CFB | −31.0 (−63.0, 10.0) | −37.5 (−70.0, 41.0) | −33.0 (−79.0, 15.0) |
| Free T (ng/dL) | Baseline | 0.50 (0.100, 1.00) | 0.50 (0.10, 1.20) | 0.35 (0.20, 0.80) |
| | Cycle 6 | 0.20 (0.09, 0.60) | 0.200 (0.09, 0.30) | 0.086 (0.09, 0.20) |
| | % CFB | −50.0 (−80.0, 0.0) | −50.0 (−83.0, 0.0) | −71.0 (−89.0, −50.0) |
| DHT (nmol/L) | Baseline | 0.350 (0.19, 1.43) | 0.350 (0.15, 0.92) | 0.390 (0.15, 6.59) |
| | Cycle 6 | 0.400 (0.15, 0.85) | 0.280 (0.15, 0.54) | 0.360 (0.15, 1.02) |
| | % CFB | −13.0 (−56.0, 80.0) | −25.0 (−72.0, 120.0) | −3.5 (−60.0, 106.0) |
| Cortisol<br>(µg/dL) | Baseline | 16.50 (9.6, 25.9) | 15.20 (9.8, 23.5) | 17.70 (8.8, 23.2) |
| | Cycle 6 | 20.60 (11.2, 32.7) | 32.70 (20.7, 39.6) | 37.70 (22.3, 62.7) |
| | % CFB | 26.0 (−25.0, 129.0) | 109.0 (13.0, 248.0) | 107.0 (13.0, 326.0) |
| Aldosterone<br>(pmol/L) | Baseline | 610.0 (90, 4106) | 617.0 (179, 2368) | 614.5 (141, 1632) |
| | Cycle 6 | 1398 (146, 4343) | 473.0 (69, 1289) | 1396 (219, 6930) |
| | % CFB | 103.0 (−80.0, 627.0) | −40.0 (−89.0, 288.0) | 179.5 (−30.0, 617.0) |

CFB = change from baseline,
DHEAS = dihydroepiandrostenedione,
DHT = dihydrotestosterone,
E2 = estradiol,
FSH = Follicle Stimulating Hormone,
free T = free testosterone,
fT3 = free triiodothyronine,
fT4 = free thyroxine,
LH = Luteinizing Hormone,
TSH = thyroid stimulating hormone.
[#]No statistical analysis was performed on E2 changes from baseline.

4.2.3. Liver Proteins

CRP values were increased in the EE/DRSP group but not in the E4/DRSP group (Table 8). At cycle 6, angiotensinogen levels increased with 170.0% and 206.5% with EE/LNG and EE/DRSP respectively, while increases were less pronounced (75.0%) with E4/DRSP. A similar pattern was seen for CBG which increased by 152.0% and 140.0% for EE/LNG and EE/DRSP, respectively, and by 40.0% for E4/DRSP. Increases of SHBG were highest with EE/DRSP (251.0%); treatment with EE/LNG and E4/DRSP increased SHBG levels with 74.0% and 55.0%, respectively. TBG levels increased with 70.0% in the EE/DRSP group, smaller changes were observed in the EE/LNG (37.0%) and E4/DRSP (17.0%) groups. The changes on CRP (0% vs +30%) were less pronounced with E4/DRSP compared to EE/DRSP. The changes with EE/DRSP were much larger for all parameters compared to E4/DRSP.

TABLE 8

Liver proteins. Median (min, max) at baseline and at cycle 6 and change from baseline at cycle 6. Values in bold represent statistical significant changes (p < 0.05) in the exploratory analysis.

| Parameter | | 15 mg E4/ 3 mg DRSP n = 34 | 30 µg EE/ 150 µg LNG n = 27 | 20 µg EE/ 3 mg DRSP n = 30 |
|---|---|---|---|---|
| CRP (mg/dL) | Baseline | 0.100 (0.10, 0.88) | 0.100 (0.10, 4.72) | 0.100 (0.10, 0.70) |
| | Cycle 6 | 0.145 (0.10, 1.77) | 0.200 (0.10, 1.51) | 0.170 (0.10, 1.09) |
| | % CFB | 0.0 (−52.0, 1670) | 30.0 (−97.0, 1410) | 30.0 (−86.0, 607.0) |
| CBG (µg/mL) | Baseline | 61.0 (45, 99) | 61.0 (30, 90) | 58.5 (45, 101) |
| | Cycle 6 | 82.5 (62, 144) | 152.0 (109, 318) | 152.5 (90, 303) |
| | % CFB | 40.0 (−27.0, 122.0) | 152.0 (65.0, 354.0) | 140.0 (65.0, 448.0) |
| SHBG (nmol/L) | Baseline | 64.75 (25.3, 117.9) | 67.30 (27.1, 144.4) | 70.55 (36.2, 125.6) |
| | Cycle 6 | 87.15 (52.7, 196.0) | 119.80 (65.2, 191.4) | 264.30 (162.3, 447.4) |
| | % CFB | 55.0 (−22.0, 171.0) | 74.0 (−17.0, 261.0) | 251.0 (122.0, 637.0) |
| TBG (mg/L) | Baseline | 18.30 (12.5, 33.9) | 18.10 (12.0, 31.9) | 17.55 (13.0, 27.5) |
| | Cycle 6 | 22.00 (16.2, 39.9) | 23.70 (18.2, 37.9) | 28.05 (20.6, 43.2) |
| | % CFB | 17.0 (−27.0, 67.0) | 37.0 (6.0, 99.0) | 70.0 (12.0, 108.0) |
| Angiotensinogen (µg/mL) | Baseline | 76.75 (47.0, 140.3) | 81.50 (41.9, 135.8) | 74.85 (43.4, 147.0) |
| | Cycle 6 | 138.00 (58.7, 231.1) | 222.90 (137.3, 399.5) | 262.50 (110.6, 453.9) |
| | % CFB | 75.0 (−26.0, 198.0) | 170.0 (39.0, 853.0) | 206.5 (103.0, 413.0) |

CBG = cortisol binding globulin,
CFB = change from baseline,
CRP = C-reactive protein,
SHBG = sex hormone binding globulin,
TBG = thyroxin binding globulin.

4.3. Discussion and Conclusions

The results of the present study, conducted with the 15 mg E4/3 mg DRSP combination and with a duration of 6 cycles, show that E4/DRSP has limited effects on endocrine parameters such as free testosterone and liver proteins such as C-reactive protein. Compared to the two reference treatments, a $2^{nd}$ generation EE-based COC (EE/LNG), and a $4^{th}$ generation EE-based COC (EE/DRSP), the E4/DRSP combination showed a favorable profile on endocrine and liver parameters. As expected, all treatments showed a decrease in E2 and progesterone levels, indicative for the contraceptive activity of these combinations. Interestingly, compared to EE/LNG and EE/DRSP, the treatment with E4/DRSP resulted in a smaller increase in cortisol and aldosterone levels and less suppression of LH and FSH, which is indicate for a lower total estrogenicity of the E4/DRSP combination. All 3 COCs showed increased levels of liver proteins although the magnitude of responses was significantly higher with EE/LNG and EE/DRSP compared to E4/DRSP for angiotensinogen, CRP, CBG, and TBG. SHBG was increased after EE/DRSP treatment, while only limited effects were seen after treatment with EE/LNG and E4/DRSP. This confirms previous observations that E4 has less impact on SHBG and indicates a lower overall estrogenicity of the E4/DRSP combination (Kluft et al., Reduced haemostatic effects with drospirenone-based oral contraceptives containing estetrol versus ethinyl estradiol, Contraception, 2017; and Hammond et al., Estetrol does not bind sex hormone binding globulin or increase its production by human HepG2 cells, Climacteric, 2008).

These results confirm previous observations that treatment with E4/DRSP had limited effects on liver proteins such as C-reactive protein and endocrine function. The effect on other endocrine parameters, including suppression of ovarian steroids, was comparable with that of the comparator preparations. Therefore, E4/DRSP combination has a favorable profile when compared to the 2nd generation (EE/LNG) and the 4th generation (EE/DRSP) EE-containing COCs.

Example 5. Impact of E4/DRSP and EE/DRSP COCs on QT Interval

QT values were measured at screening and the end of cycle 3 (day 24 or 27). QT values were corrected according to the Fridericia formula to take into account changes in heart rate (QTcf). Changes in QTcf were calculated as difference between end of cycle three QT cf-screening QTcf (a positive value indicate an increase in QTcf). Patients were either measured at 24 or 27 days. At day 24 they were under treatment, while at day 27 the treatment was already terminated.

Figure 2:
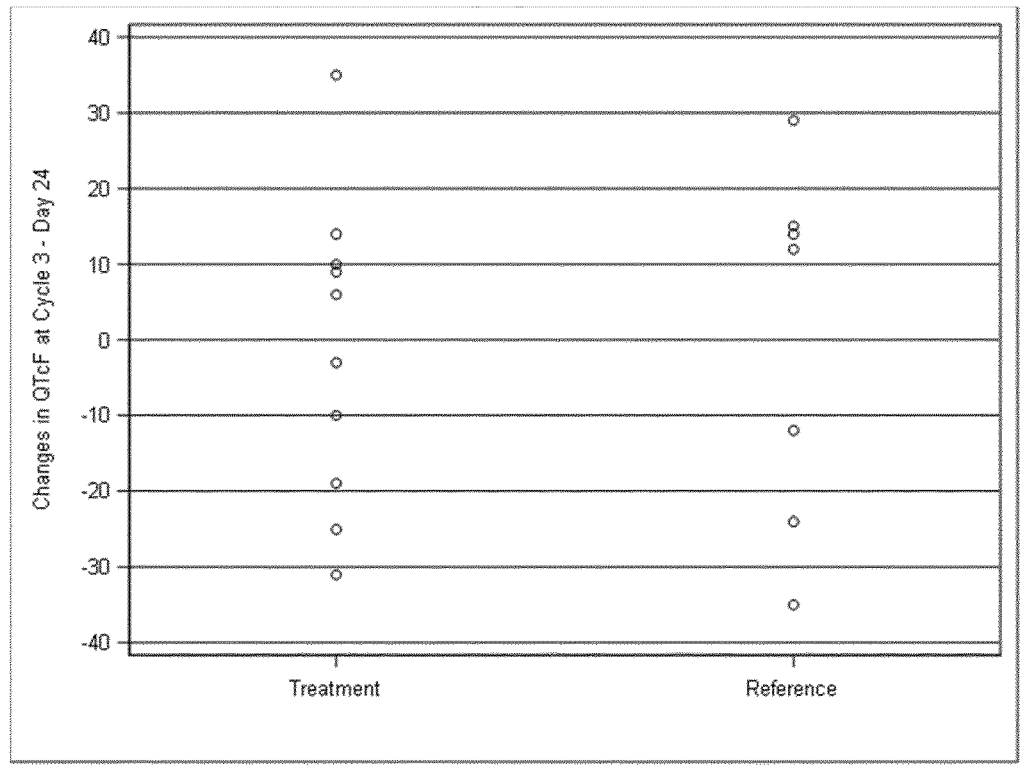
FIG. 2. Changes in QTcF interval at treatment cycle 3, day 24. Treatment group: E4/DRSP 15/3 mg, reference group: EE/DRSP 0.02/3 mg.
Figure 3:
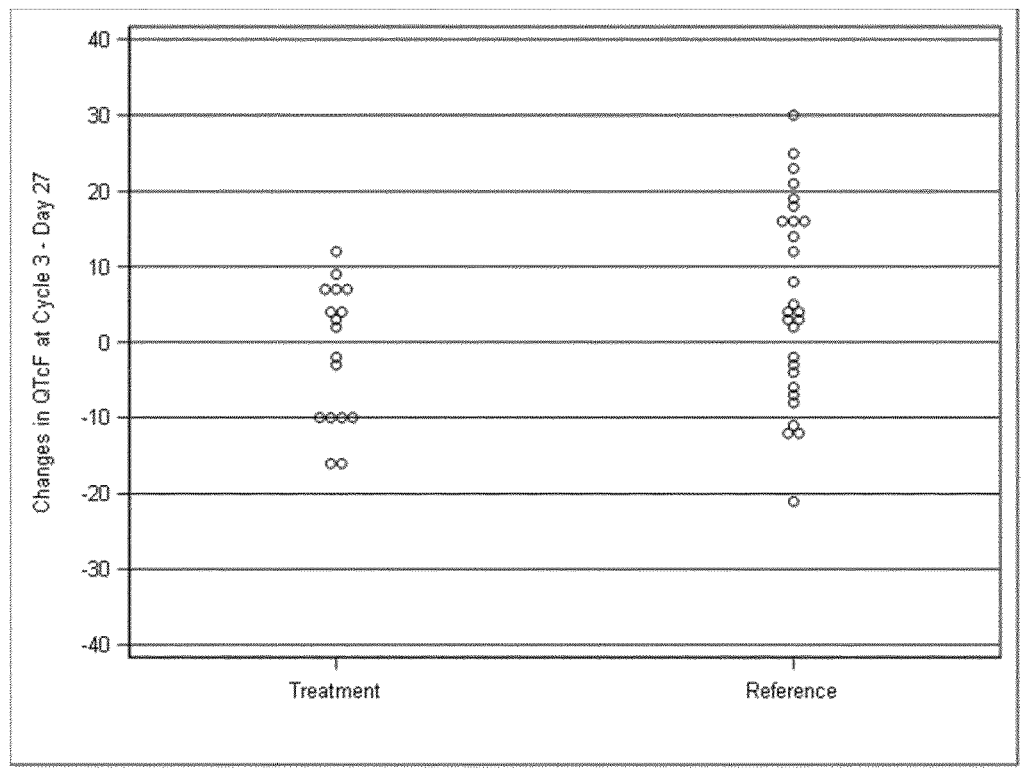
FIG. 3. Changes in QTcF interval at treatment cycle 3, day 27. Treatment group: E4/DRSP 15/3 mg, reference group: EE/DRSP 0.02/3 mg.

On average changes at the end of treatment were greater for the reference group when compared to the treated group, as shown in table 9. The results demonstrate that E4/DRSP COCs are less prone to provoke a QT prolongation when compared to the reference group (EE/DRSP COC users). Results of the QTcF analysis after 24 days and after 27 days are additionally shown in FIGS. 2 and 3. Changes in QTcf were numerically higher for the reference group, at day 27 or when all data was considered.

Changes at day 27 for the reference group were higher than 5 ms, a threshold considered to be significant for the implication on arrhythmia. This change from baseline was statistically significant.

TABLE 9

12-lead ECG; Change from baseline at Cycle 3 - Overall and by Days.

| Parameter | Day | Treatment | N | Mean | STD | Median | Difference From Baseline, p-value [1] | Difference between Treatment, p-value |
|---|---|---|---|---|---|---|---|---|
| QT Interval, Aggregate | Day 24 | EE/DRSP | 7 | 2.0 | 42.41 | −8.0 | 0.9844 | 0.6657 |
| | | E4/DRSP | 10 | 5.0 | 12.69 | 2.0 | 0.3789 | |
| | Day 27 | EE/DRSP | 28 | 12.9 | 20.62 | 12.0 | 0.0020 | 0.2166 |
| | | E4/DRSP | 17 | 4.4 | 23.66 | 0.0 | 0.5527 | |
| | Overall | EE/DRSP | 35 | 10.7 | 25.97 | 10.0 | 0.0134 | 0.2238 |
| | | E4/DRSP | 27 | 4.6 | 20.01 | 0.0 | 0.3354 | |
| QTcF Interval, Aggregate | Day 24 | EE/DRSP | 7 | −0.1 | 23.63 | 12.0 | 0.9688 | 0.7012 |
| | | E4/DRSP | 10 | −1.4 | 20.21 | 1.5 | 0.8652 | |
| | Day 27 | EE/DRSP | 28 | 5.5 | 13.09 | 4.0 | 0.0466 | 0.1155 |
| | | E4/DRSP | 17 | −1.3 | 9.06 | 2.0 | 0.6020 | |
| | Overall | EE/DRSP | 35 | 4.3 | 15.48 | 4.0 | 0.0721 | 0.1135 |
| | | E4/DRSP | 27 | −1.3 | 13.85 | 2.0 | 0.5895 | |

N = Number of subjects.
STD = Standard Deviation.
[1] Exploratory p-value to indicate if there is a possible difference between cycle 3 and baseline using the signed rank test for each treatment.

The efficacy of the treatments for preventing pregnancy was evaluated by assessing ovarian function inhibition. As shown by the distribution of Hoogland scores presented in Tale 10, most subjects showed Hoogland score 1 (no activity). No Hoogland scores above 4, and hence no ovulations, were observed in the E4/DRSP 15/3 mg group. One subject receiving EE/DRSP had a score of 6 (ovulation) in both treatment cycles.

TABLE 10

Summary of Hoogland scores.

| Cycle Phase | Hoogland Score | 15 mg E4/3 mg DRSP (N = 40) n (%) | 20 mcg EE/3 mg DRSP (N = 41) n (%) |
|---|---|---|---|
| Treatment cycle 1 | 1: No Activity | 34 (85.0) | 34 (82.9) |
| | 2: Potential Activity | 3 (7.5) | 4 (9.8) |
| | 3: Non-Active FLS | 1 (2.5) | — |
| | 4: Active FLS | 2 (5.0) | 2 (4.9) |
| | 5: LUF | — | — |
| | 6: Ovulation | — | 1 (2.4)[A] |
| | Scores 1 to 4[B] | 40 (100.0) | 40 (97.6) |
| | Scores 5 or 6 | / | 1 (2.4) |
| Treatment cycle 3[C] | 1: No Activity | 25 (62.5) | 31 (75.6) |
| | 2: Potential Activity | 4 (10.0) | 3 (7.3) |
| | 3: Non-Active FLS | 1 (2.5) | — |
| | 4: Active FLS | 8 (20.0) | 2 (4.9) |
| | 5: LUF | — | — |
| | 6: Ovulation | — | 1 (2.4)[A] |
| | Scores 1 to 4[B] | 38 (95.0) | 36 (87.8) |
| | Scores 5 or 6 | — | 1 (2.4) |

FLS: follicle like structure.
LUF: luteinized unruptured follicle.
N: total number of subjects receiving treatment.
n: number of subjects in category.
[A] Ovulation was reported for one (the same) subject in both Treatment Cycles.
[B] Overall ovarian function inhibition is indicated by a Hoogland score ≤4.
[C] In Cycle 3 some subjects dropped out and did not have a Hoogland score.

As can be deducted from the Hoogland scores, the majority of subjects were characterized by a Hoogland score of 1 (no activity). No Hoogland scores above 4, and hence no ovulations, were observed in the E4/DRSP 15/3 mg group. Remarkably, one subject receiving EE/DRSP had a score of 6 (ovulation) in both treatment cycles. E4/DRSP was able to show complete ovulation inhibition despite a lower DRSP exposure than seen with EE/DRSP.

The invention claimed is:

1. A method of treating or reducing the risks of one or more drospirenone (DRSP)-related adverse effects associated with use of a combined oral contraceptive (COC) comprising a progestogenic component comprising DRSP and an estrogenic component in a female subject in need thereof, wherein the female subject has experienced one or more DRSP-related adverse effects, the method comprising administering daily to the female subject a daily active dosage unit of an estetrol/DRSP COC comprising 10 mg to 20 mg of estetrol as the estrogenic component and 1 mg to 5 mg of DRSP as the progestogenic component,
wherein the method is effective to treat or reduce the risks of one or more DRSP-related adverse effects selected from (i) QT interval prolongation of at least 5 milliseconds and (ii) increase of C-reactive protein blood plasma concentration to an elevated level, each as compared to a comparator COC comprising DRSP and an estrogenic component comprising an estrogen other than estetrol, and
wherein the daily administration of the estetrol/DRSP COC results in a pharmacokinetic profile for DRSP in blood plasma of the female subject having one or both of (i) a geometric mean AUC0-24 of DSRP between about 150 and about 1000 ng·h/ml and (ii) a geometric mean Cmax of DSRP between about 10 ng/ml and 100 ng/ml.

2. The method of claim 1, wherein the daily active dosage unit is provided in a contraceptive kit comprising one or more packaging units each comprising 21 to 28 of the daily active dosage units.

3. The method of claim 1, wherein the daily active dosage unit is administered continuously in cycles of 21 to 28 daily administrations.

4. The method of claim 1, wherein the comparator COC comprises ethinyl-estradiol (EE) as the estrogen other than estetrol.

5. The method of claim 1, wherein the method is effective to reduce the risks of QT interval prolongation of at least 5 milliseconds.

6. The method of claim 5, wherein a risk of experiencing QT interval prolongation of at least 5 milliseconds is reduced by at least 10% as compared to the risk associated with the comparator COC.

7. The method of claim 5, wherein a mean QT interval prolongation of the female subject administered the estetrol/DRSP COC is at least 20% shorter than that of a subject administered the comparator COC.

8. The method of claim 5, wherein the daily active dosage unit has reduced estrogenic-related effects on the QT interval as compared to the comparator COC.

9. The method of claim 1, wherein the method is effective to reduce the risks of an increase in C-reactive protein blood plasma concentration to an elevated level.

10. The method of claim 9, wherein the method is effective to reduce the risks of an increase in C-reactive protein blood plasma concentration to an elevated level that is at least 10% higher than a baseline value, wherein the baseline value is the C-reactive protein blood plasma concentration in the female subject before administration of a COC comprising DRSP.

11. The method of claim 9, wherein the C-reactive protein blood plasma concentration in the female subject administered the estetrol/DRSP COC is less than 2.00 mg/L.

12. The method of claim 1, wherein the daily active dosage unit is administered in periodic cycles each comprising an administration-free interval of 4 to 7 days.

13. The method of claim 1, wherein a single daily active dosage unit comprises about 15 mg drospirenone and about 3 mg estetrol.

* * * * *